US012578722B2

(12) United States Patent
Suzuki et al.

(10) Patent No.: US 12,578,722 B2
(45) Date of Patent: Mar. 17, 2026

(54) OPERATION ASSISTANCE METHOD, OPERATION ASSISTANCE SYSTEM, AND OPERATION ASSISTANCE PROGRAM

(71) Applicant: Yanmar Holdings Co., Ltd., Osaka (JP)

(72) Inventors: Shogo Suzuki, Okayama (JP); Shinnosuke Miyamoto, Okayama (JP); Keisuke Iwamura, Okayama (JP); Dai Uehara, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 289 days.

(21) Appl. No.: 18/121,008

(22) Filed: Mar. 14, 2023

(65) Prior Publication Data

US 2023/0315087 A1      Oct. 5, 2023

(30) Foreign Application Priority Data

Mar. 31, 2022      (JP) ................................. 2022-059515

(51) Int. Cl.
*G05D 1/00*           (2006.01)
*B60K 35/22*          (2024.01)
(Continued)

(52) U.S. Cl.
CPC ........... *G05D 1/0044* (2013.01); *B60K 35/22* (2024.01); *B60K 35/29* (2024.01); *B60K 35/60* (2024.01);

(Continued)

(58) Field of Classification Search
CPC .. G05D 1/0044; G05D 1/0016; G05D 1/0088; B60K 35/20; B60K 35/22; B60K 35/28; B60K 35/29; B60K 35/60; B60K 35/80; B60K 35/10; B60K 2360/119; B60K 2360/151; B60K 2360/166;

(Continued)

(56) References Cited

U.S. PATENT DOCUMENTS 10,146,357 B2 * 12/2018 Bendewald ............ B60K 35/85
2009/0076933 A1 * 3/2009 Park ..................... G06Q 10/047
                                                          705/28

(Continued)

FOREIGN PATENT DOCUMENTS

EP          3175693 A1     6/2017
EP          3744160 A1     12/2020
(Continued)

OTHER PUBLICATIONS

Notice of Reasons for Refusal, Patent Application Nomber: Japanese Patent Application No. 2022 to 059515, Draft date: Mar. 21, 2025.

*Primary Examiner* — Richard M Camby
(74) *Attorney, Agent, or Firm* — Chris Mizumoto

(57) ABSTRACT
A display processing unit causes displays a work screen on an operation device that is used for autonomous travel of a work vehicle. The display processing unit displays travel information on a location of the work vehicle in a display area included in the work screen. A setting processing unit switches between a setting to display travel information on a travel state of the work vehicle in display areas included in the work screen and a setting not to display the travel information in the display areas.

11 Claims, 19 Drawing Sheets

(51) Int. Cl.
    *B60K 35/29*          (2024.01)
    *B60K 35/60*          (2024.01)
    *B60K 35/80*          (2024.01)

(52) U.S. Cl.
    CPC ........... *B60K 35/80* (2024.01); *G05D 1/0016*
                 (2013.01); *G05D 1/0088* (2013.01)

(58) Field of Classification Search
    CPC .............. B60K 2360/195; B60K 35/00; A01B
                69/008; B60Y 2200/221; B60Y 2400/92
    See application file for complete search history.

(56)                 References Cited

U.S. PATENT DOCUMENTS

| | | | |
|---|---|---|---|
| 2016/0231743 A1* | 8/2016 | Bendewald | B60K 35/60 |
| 2017/0235848 A1* | 8/2017 | Van Dusen | G06Q 10/101 |
| | | | 705/12 |
| 2019/0001968 A1* | 1/2019 | Yorifuji | B60K 35/22 |
| 2021/0042076 A1* | 2/2021 | Chengalvala | B60H 1/00778 |
| 2021/0214922 A1* | 7/2021 | Yamashita | B60K 35/50 |
| 2021/0350713 A1* | 11/2021 | Van Meeteren | G05D 1/0022 |
| 2022/0287218 A1* | 9/2022 | Yuasa | G05D 1/648 |
| 2023/0380323 A1* | 11/2023 | Koyama | G05D 1/648 |

FOREIGN PATENT DOCUMENTS

| | | |
|---|---|---|
| JP | 2018117558 A | 8/2018 |
| JP | 2019004800 A | 1/2019 |
| JP | 2019127119 A | 8/2019 |
| JP | 2020022398 A | 2/2020 |

* cited by examiner

CAN START ASSISTING STRAIGHT TRAVEL

PRESS AUTO
SWITCH

73

AUTOMATIC MACHINE
OPERATION

CURRENTLY ASSISTING STRAIGHT TRAVEL

73

AUTOMATIC MACHINE
OPERATION

AUTOMATIC MACHINE
OPERATION

Ks

P21

1

OPERATION ASSISTANCE METHOD, OPERATION ASSISTANCE SYSTEM, AND OPERATION ASSISTANCE PROGRAM

CROSS-REFERENCE

This application claims foreign priority of JP2022-059515, filed Mar. 31, 2022, the disclosure of which is hereby incorporated by reference in its entirety.

TECHNICAL FIELD

The present invention relates to an operation assistance method, an operation assistance system, and an operation assistance program for assisting with an operator's operation on an operation terminal that is used for a travel operation of a work vehicle.

BACKGROUND ART

The following technique has been known. In the technique, guidance information, driving information, and the like related to autonomous travel are displayed on a display device when a work vehicle travels autonomously in a field (for example, see Patent Document 1).

PRIOR ART DOCUMENT

Patent Document

Patent Document 1: Japanese Unexamined Patent Application Publication No. 2019-127119

SUMMARY OF INVENTION

Technical Problem

However, in the conventional technique, the information is uniformly displayed on the display device. Thus, even when the information is useful for a certain user (an operator), such information may be unnecessary for another user. For example, constant display of the guidance information is bothersome for a skilled operator. Just as described, the conventional technique has a problem of degraded convenience of the operation terminal that displays the information on the travel of the work vehicle.

The present invention has a purpose of providing an operation assistance method, an operation assistance system, and an operation assistance program capable of improving convenience of an operation terminal that displays information on travel of a work vehicle.

Solution to Problem

An operation assistance method according to the present invention executes: displaying a display screen on an operation terminal that is used for a travel operation of a work vehicle; displaying first information on a location of the work vehicle in a first display area included in the display screen; and switching between a setting to display second information on a travel state of the work vehicle in a second display area included in the display screen and a setting not to display the second information in the second display area.

An operation assistance system according to the present invention includes a first display processing unit, a second display processing unit, and a setting processing unit. The first display processing unit displays a display screen on an operation terminal that is used for a travel operation of a work vehicle. The second display processing unit displays first information on a location of the work vehicle in a first display area included in the display screen. The setting processing unit switches between a setting to display second information on a travel state of the work vehicle in a second display area included in the display screen and a setting not to display the second information in the second display area.

An operation assistance program according to the present invention is an operation assistance program for causing one or plural processors to: display a display screen on an operation terminal that is used for a travel operation of a work vehicle; display first information on a location of the work vehicle in a first display area included in the display screen; and switch between a setting to display second information on a travel state of the work vehicle in a second display area included in the display screen and a setting not to display the second information in the second display area.

Advantageous Effects of Invention

The present invention can provide the operation assistance method, the operation assistance system, and the operation assistance program capable of improving convenience of the operation terminal that displays the information on travel of the work vehicle.

BRIEF DESCRIPTION OF DRAWINGS

FIG. 7 is a view illustrating a configuration of the work screen that is displayed in the operation device according to the embodiment of the present invention.

DESCRIPTION OF EMBODIMENTS

The following embodiment is an example that embodies the present invention, and is not intended to limit the technical scope of the present invention.

Figure 1:
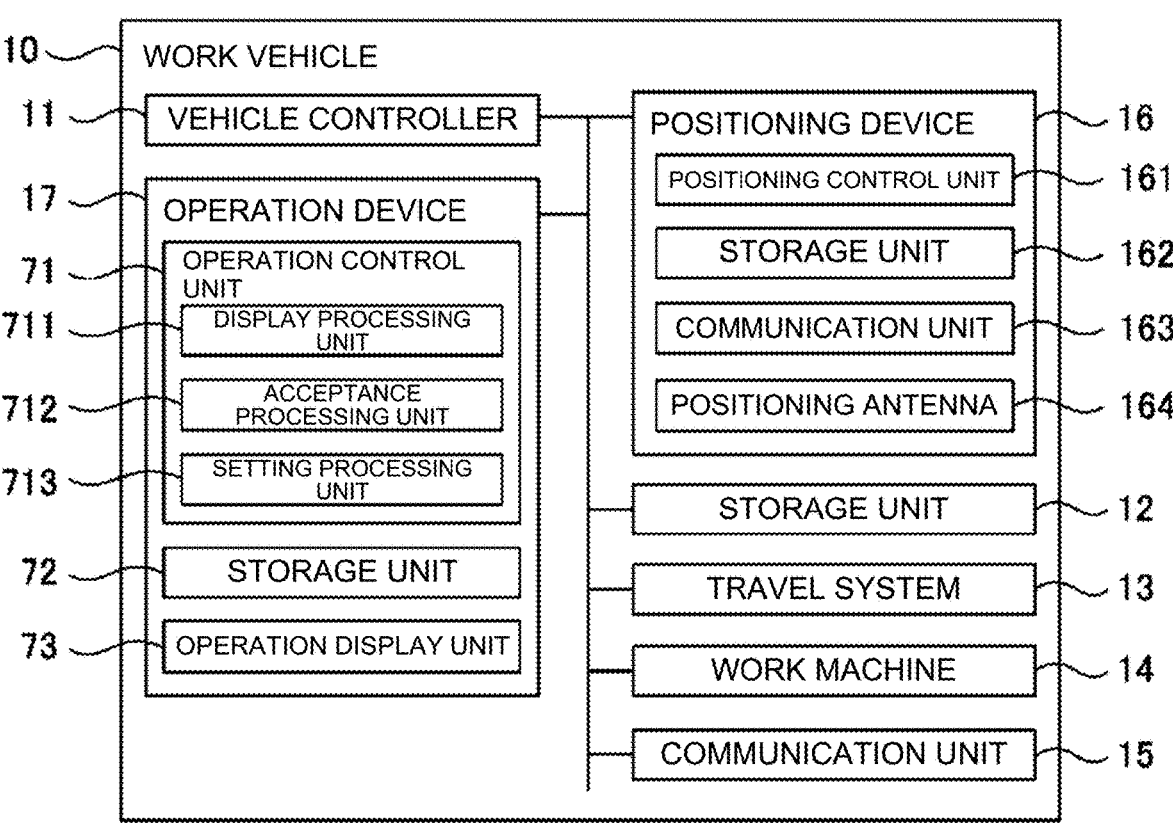
FIG. 1 is a block diagram illustrating a configuration of a work vehicle according to an embodiment of the present invention.
Figure 2:
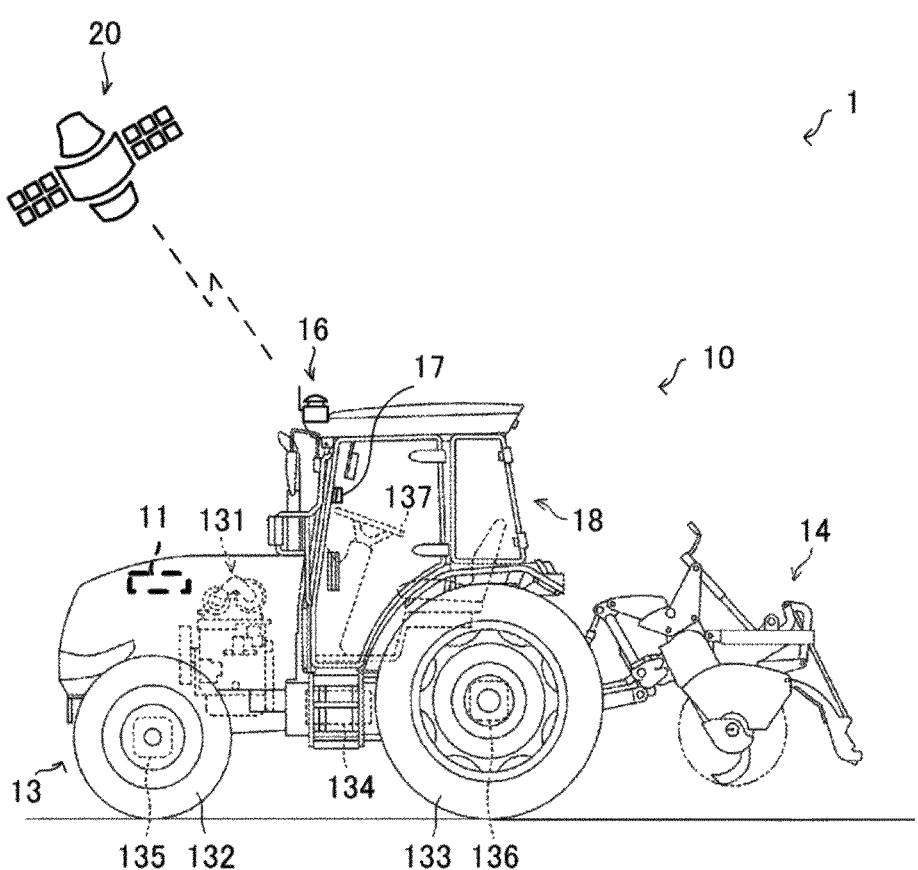
FIG. 2 is an external view illustrating an example of the work vehicle according of the embodiment of the present invention.

As illustrated in FIG. 1 and FIG. 2, an autonomous travel system 1 according to an embodiment of the present invention includes a work vehicle 10, a satellite 20, and a base station (not illustrated). In the present embodiment, a description will be made on a case where the work vehicle 10 is a tractor as an example. As another embodiment, the work vehicle 10 may be a rice transplanter, a combine harvester, a construction machine, a snowplow, or the like. In response to an operator's operation, the work vehicle 10 performs predetermined work (for example, tillage work) while traveling along a target route R in a field F (see FIG. 4). More specifically, the work vehicle 10 travels the target route R straight in response to automatic steering and makes a turn in response to manual steering (a driving operation) by the operator. The work vehicle 10 travels in the field F and performs the work while switching between the autonomous travel on the straight route and the manual travel on the turning route. The target route R may be generated in advance on the basis of the operator's operation and stored as route data. The work vehicle 10 may have a function of automatically increasing/reducing a vehicle speed (a vehicle speed control function). For example, the work vehicle 10 may automatically change the vehicle speed according to a travel route.

Figure 4:
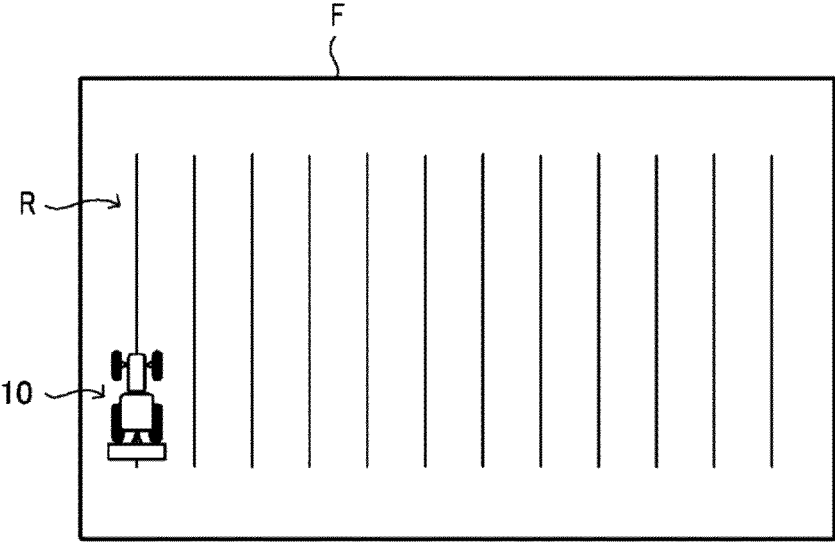
FIG. 4 is a view illustrating an example of a target route of the work vehicle according to the embodiment of the present invention.

For example, in the field F illustrated in FIG. 4, the work vehicle 10 travels by repeating the straight travel and the turning travel until the work is finished. The plural straight routes are substantially parallel to each other. The target route R illustrated in FIG. 4 is one example. The target route R is appropriately determined according to a size of the work vehicle 10, a size of a work machine 14, contents of the work, a shape of the field F, and the like.

The autonomous travel system 1 may include an operation terminal (a tablet terminal, a smartphone, or the like) that is operated by the operator. The operation terminal can communicate with the work vehicle 10 via a communication network such as a mobile phone network, a packet line network, or a wireless LAN. For example, the operator operates the operation terminal to register various types of information (such as work vehicle information, field information, and work information) and the like. In addition, at a location away from the work vehicle 10, the operator can comprehend a travel situation, a work situation, and the like of the work vehicle 10 from a travel locus that is displayed on the operation terminal.

[Work Vehicle 10]

As illustrated in FIG. 1 and FIG. 2, the work vehicle 10 includes a vehicle controller 11, a storage unit 12, a travel system 13, the work machine 14, a communication unit 15, a positioning device 16, an operation device 17, and the like. The vehicle controller 11 is electrically connected to the storage unit 12, the travel system 13, the work machine 14, the positioning device 16, the operation device 17, and the like. Here, the vehicle controller 11 and the positioning device 16 may be wirelessly communicable. The vehicle controller 11 and the operation device 17 may also be wirelessly communicable.

The communication unit 15 is a communication interface that connects the work vehicle 10 to the communication network in a wired/wireless manner for data communication with an external device (the operation terminal or the like) via the communication network according to a predetermined communication protocol.

The storage unit 12 is a non-volatile storage unit, such as a hard disk drive (HDD) or a solid state drive (SSD), that stores the various types of the information. The storage unit 12 stores a control program such as an autonomous travel program for causing the vehicle controller 11 to execute autonomous travel processing. For example, the autonomous travel program is recorded in a non-transitory manner in a computer-readable recording medium such as a CD or a DVD, is read by a predetermined reader (not illustrated), and is stored in the storage unit 12. However, the autonomous travel program may be downloaded to the work vehicle 10 from a server (not illustrated) via the communication network and stored in the storage unit 12. In addition, the storage unit 12 may store data on the target route R that is generated in the operation device 17.

The travel system 13 is a drive unit for driving the work vehicle 10. As illustrated in FIG. 2, the travel system 13 includes an engine 131, a front wheel 132, a rear wheel 133, a transmission 134, a front axle 135, a rear axle 136, a steering wheel 137, and the like. The front wheel 132 and the rear wheel 133 are each provided to right and left sides of the work vehicle 10. Here, the travel system 13 is not limited to that of a wheel type including the front wheels 132 and the rear wheels 133 but may be that of a crawler type including a crawler that is provided to the right and left sides of the work vehicle 10.

The engine 131 is a drive source, such as a diesel engine or a gasoline engine, that is driven by using fuel supplied to an unillustrated fuel tank. In addition to the engine 131, or instead of the engine 131, the travel system 13 may include an electric motor as the drive source. A generator, which is not illustrated, is connected to the engine 131, and electric power is supplied from the generator to electrical components such as the vehicle controller 11, a battery, and the like that are provided in the work vehicle 10. The battery stores the electric power that is supplied from the generator. The electrical components such as the vehicle controller 11, the positioning device 16, and the operation device 17 provided in the work vehicle 10 can be driven by the electric power supplied from the battery even after the engine 131 is stopped.

Drive power of the engine 131 is transmitted to the front wheels 132 via the transmission 134 and the front axle 135 and is transmitted to the rear wheels 133 via the transmission 134 and the rear axle 136. The drive power of the engine 131 is also transmitted to the work machine 14 via a PTO shaft (not illustrated). The travel system 13 performs travel operation according to a command of the vehicle controller 11.

For example, the work machine 14 is a cultivator, a sowing machine, a mower, a plow, or a fertilizer and can be attached/detached to/from the work vehicle 10. Thus, the work vehicle 10 can perform any of various works by using the respective work machine 14. FIG. 2 illustrates a case where the work machine 14 is the cultivator. In the work vehicle 10, the work machine 14 may be supported by a lift mechanism, which is not illustrated, in a manner to be able to be lifted or lowered. The vehicle controller 11 can lift/lower the work machine 14 by controlling the lift mechanism.

The steering wheel 137 is an operation unit that is operated by the operator or the vehicle controller 11. For example, the travel system 13 changes an angle of the front wheel 132 by a hydraulic power steering mechanism (not illustrated) in response to an operation of the steering wheel 137 by the operator or the vehicle controller 11, so as to change an advancing direction of the work vehicle 10.

In addition to the steering wheel 137, the travel system 13 includes a shift lever, an accelerator, a brake, and the like that are operated by the vehicle controller 11. Then, in the travel system 13, a gear of the transmission 134 is switched to a forward gear, a reverse gear, or the like according to an operation of the shift lever by the vehicle controller 11, and a travel aspect of the work vehicle 10 is thereby switched to forward travel, reverse travel, or the like. In addition, the vehicle controller 11 operates the accelerator to control a speed of the engine 131. Furthermore, the vehicle controller 11 operates the brake to control rotation of the front wheels 132 and the rear wheels 133 with an electromagnetic brake.

The positioning device 16 is a communication device that includes a positioning control unit 161, a storage unit 162, a communication unit 163, a positioning antenna 164, and the like. For example, as illustrated in FIG. 2, the positioning device 16 is provided on top of a cabin 18 which the operator sits in. However, an installation location of the positioning device 16 is not limited to the cabin 18. Furthermore, the positioning control unit 161, the storage unit 162, the communication unit 163, and the positioning antenna 164 of the positioning device 16 may be dispersed at different locations in the work vehicle 10. As described above, the battery is connected to the positioning device 16, and the positioning device 16 can be operated even when the engine 131 is stopped. For example, a mobile phone terminal, the smartphone, the tablet terminal, or the like may be used in place of the positioning device 16.

The positioning control unit 161 is a computer system that includes one or plural processors and storage memory such as non-volatile memory and RAM. The storage unit 162 is non-volatile memory that stores: a positioning control program for causing the positioning control unit 161 to execute positioning processing; and data such as positioning information and movement information. For example, the positioning control program is recorded in the non-transitory manner in a computer-readable recording medium such as a CD or a DVD, is read by the predetermined reader (not illustrated), and is stored in the storage unit 162. However, the positioning control program may be downloaded to the positioning device 16 from the server (not illustrated) via the communication network and stored in the storage unit 162.

The communication unit 163 is a communication interface that connects the positioning device 16 to the communication network in the wired or wireless manner for the data communication with the external device such as a base station server via the communication network according to the predetermined communication protocol.

The positioning antenna 164 is an antenna that receives a radio wave (a GNSS signal) emitted from the satellite 20.

The positioning control unit 161 calculates a current location of the work vehicle 10 on the basis of the GNSS signal that is received by the positioning antenna 164 from the satellite 20. For example, in the case where the positioning antenna 164 receives the radio waves (emitted time, locus information, and the like) emitted from the plural satellites 20 at the time when the work vehicle 10 travels autonomously in the field F, the positioning control unit 161 calculates a distance between the positioning antenna 164 and each of the satellites 20 and calculates the current location (a latitude and a longitude) of the work vehicle 10 on the basis of the calculated distance. Alternatively, the positioning control unit 161 may adopt a real-time kinematic positioning method (an RTK-GPS positioning method (an RTK method)) to calculate the current location of the work vehicle 10 by using correction information that corresponds to the base station (a reference station) near the work vehicle 10. Just as described, the work vehicle 10 travels autonomously by using the positioning information acquired by the RTK method. Here, the current location of the work vehicle 10 may be the same location as the positioned location (for example, a location of the positioning antenna 164) or may be a location that deviates from the positioned location.

The operation device 17 is a device that is operated by the operator who rides in the work vehicle 10, displays the various types of the information, and accepts the operator's operation. More specifically, the operation device 17 accepts various setting operations from the operator by displaying various setting screens and displays information on the traveling work vehicle 10. A specific configuration of the operation device 17 will be described below.

The vehicle controller 11 includes control devices such as a CPU, ROM, and RAM. The CPU is a processor that executes various types of arithmetic processing. The ROM is a non-volatile storage unit that stores, in advance, control programs such as a BIOS and an OS for causing the CPU to execute the various types of the arithmetic processing. The RAM is a volatile or non-volatile storage unit that stores the various types of the information, and is used as transient storage memory (a workspace) for various types of processing executed by the CPU. Then, when the CPU executes the various control programs, which are stored in the ROM or the storage unit 12 in advance, the vehicle controller 11 controls the work vehicle 10. In addition, in the vehicle controller 11, the CPU executes the various types of the processing according to the autonomous travel program.

More specifically, the vehicle controller 11 controls the travel of the work vehicle 10. For example, when a travel mode of the work vehicle 10 is the manual travel (a manual travel mode), the vehicle controller 11 causes the work vehicle 10 to travel manually on the basis of the operator's operation (the manual steering). For example, the vehicle controller 11 acquires operation information that corresponds to the operator's driving operation such as a steering wheel operation, a gearshift operation, a shift lever operation, an accelerator operation, or a brake operation. Then, the vehicle controller 11 causes the travel system 13 to perform the travel operation on the basis of the operation information.

Meanwhile, when the travel mode of the work vehicle 10 is the autonomous travel (an autonomous travel mode), the vehicle controller 11 causes the work vehicle 10 to travel autonomously on the basis of location information (the positioning information) that indicates the current location of the work vehicle 10 positioned by the positioning control unit 161. For example, when the work vehicle 10 satisfies an autonomous travel start condition and the vehicle controller 11 acquires a travel start instruction from the operator, the vehicle controller 11 starts the autonomous travel of the work vehicle 10 on the basis of the positioning information. Then, the vehicle controller 11 causes the work vehicle 10 to travel autonomously along the target route R (the straight route) that is generated in advance.

A description will herein be made on a specific example (a first travel pattern) of the autonomous travel according to the present embodiment with reference to FIGS. 5A, 5B, 5C and FIG. 6A, 6B. In the present embodiment, the work vehicle 10 is made to travel autonomously on a straight route in the field F illustrated in FIG. 4.

First, the operator sets a reference line L1 for generating the straight route as the target route R. For example, at a desired location (for example, an outer circumferential end) in the field F, the operator manually drives the work vehicle 10 in a direction (a target direction) in which the operator wants the work vehicle 10 to travel and work. More specifically, the operator drives the work vehicle 10 straight in a direction that is parallel to a work direction (a tillage direction, for example) at the time when the work vehicle 10 works at a workplace. Then, when manually driving the work vehicle 10 in the intended target direction, the operator operates (for example, touches) an operation display unit 73 (see FIG. 3) twice at the desired location (for example, an end of the workplace in a front-rear direction). The vehicle controller 11 registers a location (a point A) of the work vehicle 10 by the operator's first operation and registers a location (a point B) of the work vehicle 10 by the operator's second operation. When acquiring location information of the point A and the point B, the vehicle controller 11 sets a straight line that passes through the point A and the point B as the reference line L1 (see FIG. 5A). Here, the vehicle controller 11 may be able to register the point B in the case where the work vehicle 10 travels for a predetermined distance (for example, 5 m) after the point A is registered. In this way, it is possible to set the further accurate reference line L1. The vehicle controller 11 generates a travel route (the target route R) including the reference line L1 and plural straight lines that are parallel to the reference line L1. For example, based on a work width (a lateral width of the work machine 14) and a lap width (a width that overlaps an adjacent worked area), which are set in advance, the vehicle controller 11 generates the plural parallel straight lines at equally-spaced intervals in a right and left direction with the reference line L1 being a center (see FIG. 5B). The vehicle controller 11 registers the generated target route R in the storage unit 12 and causes the operation device 17 to display the generated target route R.

Figure 5A:
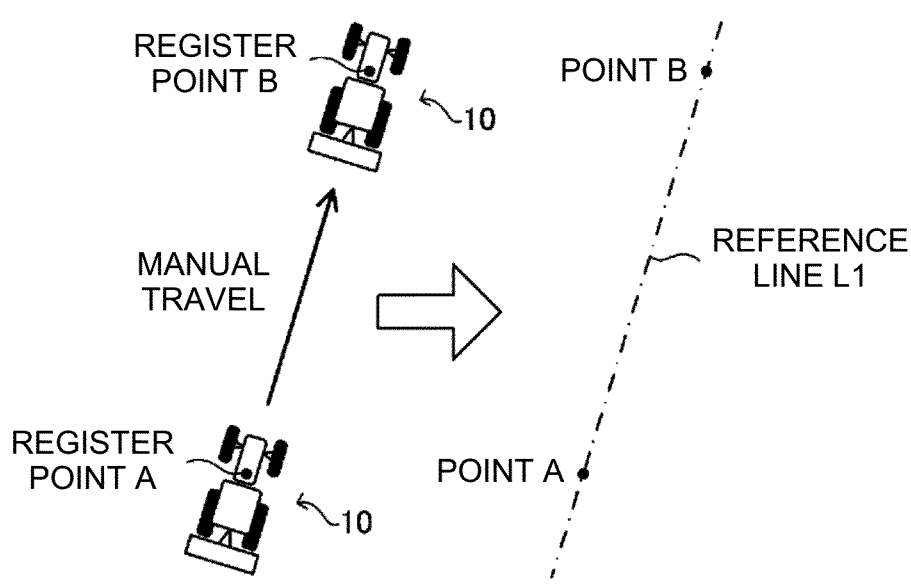
FIG. 5A is a view for explaining a travel method for autonomous travel of the work vehicle according to the embodiment of the present invention.
Figure 5B:
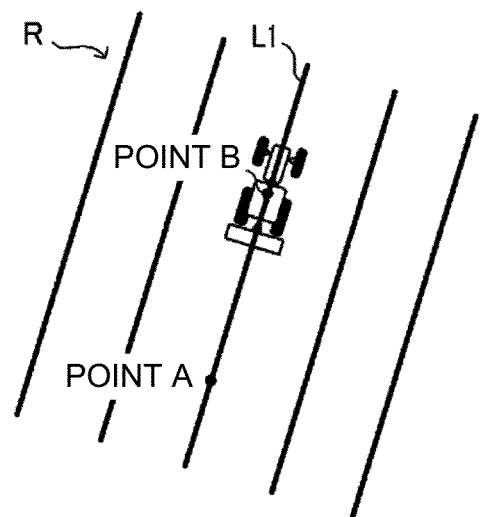
FIG. 5B is a view for explaining the travel method for the autonomous travel of the work vehicle according to the embodiment of the present invention.
Figure 5C:
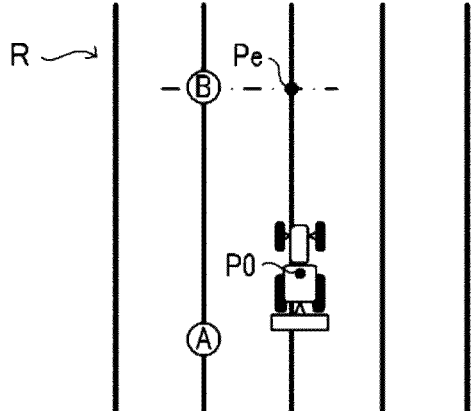
FIG. 5C is a view for explaining the travel method for the autonomous travel of the work vehicle according to the embodiment of the present invention.

In the case where the operator drives the work vehicle 10 straight in the field F by automatic steering after the target route R is generated, the operator moves the work vehicle 10 by manual steering while seeing the target route R displayed in the operation device 17 such that a direction (an orientation) of the work vehicle 10 falls within a predetermined range (a predetermined orientation) with respect to a direction of the reference line L1 (an autonomous travel start condition is satisfied) (see FIG. 5C).

Figure 6A:
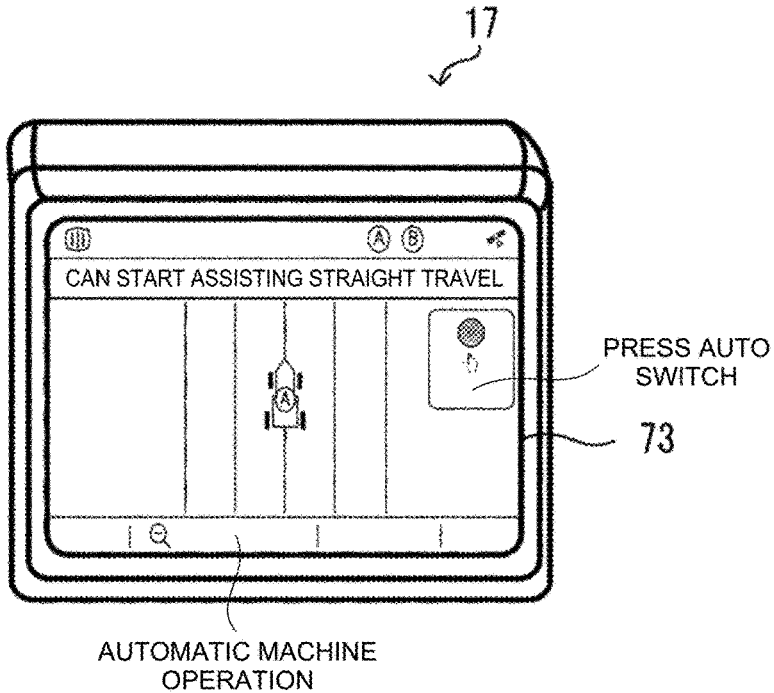
FIG. 6A is a view illustrating an example of a work screen that is displayed in an operation device according to the embodiment of the present invention.

FIG. 6A illustrates an operation screen (a work screen) showing that the work vehicle 10 satisfies the autonomous travel start condition and thus is brought into a state of enabling the autonomous travel. When the work vehicle 10 satisfies the autonomous travel start condition, the vehicle controller 11 causes the operation display unit 73 to display the operation screen illustrated in FIG. 6A. When the work vehicle 10 is brought into the state of enabling the autonomous travel, the operator presses an autonomous travel button (not illustrated) in the operation display unit 73 and issues a travel start instruction. When accepting the travel start instruction, the vehicle controller 11 starts the automatic steering of the work vehicle 10 such that the work vehicle 10 travels along the straight route that is closest to a current location P0 (see FIG. 5C). In this way, the vehicle controller 11 causes the work vehicle 10 to travel autonomously along the straight route by the automatic steering.

Figure 6B:
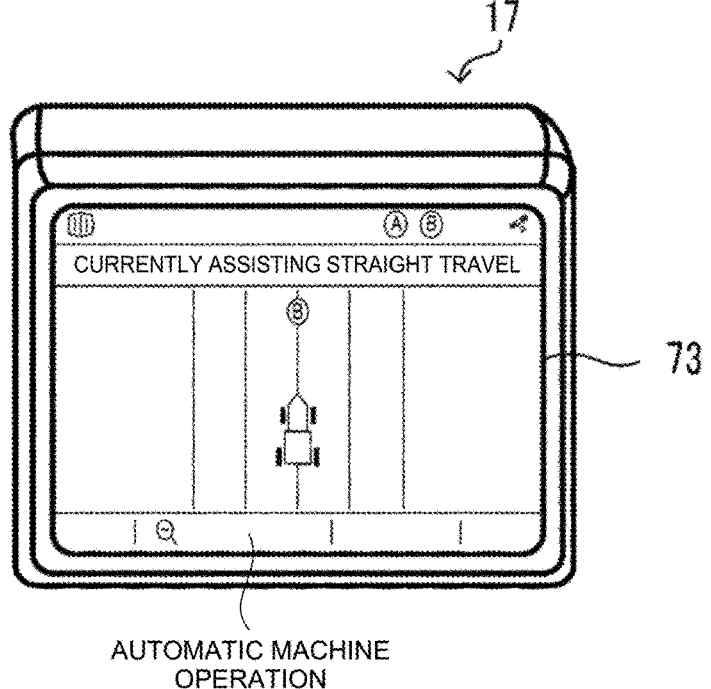
FIG. 6B is a view illustrating an example of the work screen that is displayed in the operation device according to the embodiment of the present invention.

FIG. 6B illustrates a display screen (a work screen) that is shown during the autonomous travel of the work vehicle 10. When the work vehicle 10 starts the autonomous travel, the vehicle controller 11 causes the operation device 17 to display the work screen illustrated in FIG. 6B. For example, based on the information (travel information and the like) that is acquired from the vehicle controller 11, the operation device 17 displays the location of the work vehicle 10, the straight route, the worked area (a work status), guidance information (will be described below), and the like on the work screen of the operation display unit 73.

As described so far, the first travel pattern of the autonomous travel is configured that the target route R is generated in advance according to the work width and the lap width of the work vehicle 10 and the work vehicle 10 thereby travels autonomously. As a second travel pattern of the autonomous travel, it may be configured that the target route R is generated with the location of the work vehicle 10 being a reference and the work vehicle 10 thereby travels autonomously.

In the second travel pattern, for example, in the case where the operator moves the work vehicle 10 to a location where the work is started, and presses the autonomous travel button after the reference line L1 is set (see FIG. 5A), the vehicle controller 11 causes the work vehicle 10 to travel straight from such a location in parallel with the reference line L1 by the automatic steering.

The vehicle controller 11 may apply the first travel pattern or the second travel pattern according to the operator's selection operation. For example, the vehicle controller 11 may cause the operation device 17 to display a first route generation mode corresponding to the first travel pattern and a second route generation mode corresponding to the second travel pattern to be selectable, and may make the autonomous travel by the route generation mode selected by the operator.

In the first travel pattern and the second travel pattern, when the work vehicle 10 travels straight by the automatic steering and arrives at an end Pe corresponding to the point B of the reference line L1 (a point at an intersection of a perpendicular line through the point B to the reference line L1 with the straight route (a straight line)) (see FIG. 5C), the vehicle controller 11 notifies (displays a message, provides voice guidance, or the like for) the operator of information on arrival at the end Pe (the guidance information, which will be described below). When the work vehicle 10 arrives at the end Pe, the operator terminates the automatic steering.

When the work vehicle 10 arrives at the end Pe (the end of the straight route), the vehicle controller 11 switches the travel mode to the manual travel. The vehicle controller 11 may switch the travel mode to the manual travel when determining that the work vehicle 10 has arrived at the end Pe, or may switch the travel mode to the manual travel in response to the operator's operation. When the travel mode is switched to the manual travel, for example, the operator performs turning travel (the manual travel) of the work vehicle 10 by the manual steering.

As described so far, the vehicle controller 11 switches the travel mode in response to the operator's operation on the operation device 17, causes the work vehicle 10 to travel autonomously on the straight route (the target route R) by the automatic steering, and causes the work vehicle 10 to travel manually on the turning road by the manual steering.

By the way, a technique of displaying the guidance information, driving information, and the like related to the autonomous travel on a display device (corresponding to the operation device 17 in the present embodiment) to assist with the operator's operation has conventionally been known. However, in the conventional technique, the information is uniformly displayed on the display device. Thus, even when the information is useful for a certain user (the operator), such information may be unnecessary for another user. For example, constant display of the guidance information is bothersome for the skilled operator. Just as described, the conventional technique has a problem of degraded convenience of an operation terminal (the operation device 17) that displays the information on the travel of the work vehicle. Meanwhile, with the configuration in the present embodiment, it is possible to improve the convenience of the operation terminal (the operation device 17) that displays the information on the travel of the work vehicle. A description will hereinafter be made on a specific configuration of the operation device 17.

[Operation Device 17]

As illustrated in FIG. 1, the operation device 17 includes an operation control unit 71, a storage unit 72, an operation display unit 73, and the like. The operation device 17 may be a device that can be attached/detached to/from the work vehicle 10. Alternatively, the operation device 17 may be a mobile terminal (the tablet terminal, the smartphone, or the like) that can be carried by the operator. The operation device 17 is communicably connected to the vehicle controller 11 in the wired or wireless manner.

The operation display unit 73 is a user interface that includes: a display such as a liquid-crystal display or an organic EL display for displaying the various types of the information; and an operation unit such as operation buttons or a touch panel that accepts operations. The operation display unit 73 displays any of the various setting screens, work screens, and the like in response to an instruction from the operation control unit 71. In addition, the operation display unit 73 accepts the operator's operation on the setting screen or the work screen.

The operation unit includes: the autonomous travel button that is used by the operator to issue the travel start instruction when the operator starts the autonomous travel of the work vehicle 10; an offset button that is used for an offset operation (a correction operation) to correct a location deviation between the work vehicle 10 and the target route R; and plural selection buttons, each of which is used for the selection operation on the setting screen or the work screen (none of those is illustrated). The operation device 17 is an example of the operation terminal in the present invention.

Figure 3:
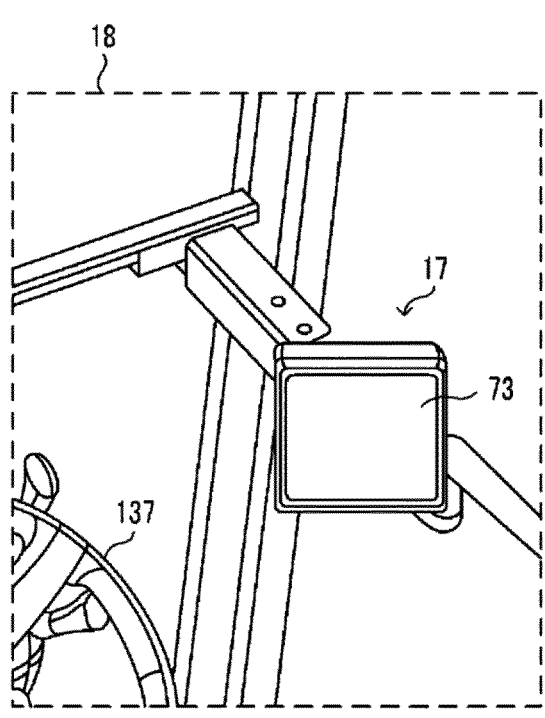
FIG. 3 is an external view illustrating an example of an operation device according to the embodiment of the present invention.

For example, as illustrated in FIG. 2 and FIG. 3, the operation device 17 is installed near the steering wheel 137 in the cabin 18.

The storage unit 72 is a non-volatile storage unit such as an HDD or an SSD that stores the various types of the information. The storage unit 72 stores a control program such as an operation assistance program for causing the operation device 17 to execute operation assistance processing (see FIG. 14), which will be described below. For example, the operation assistance program is non-transiently recorded in a computer-readable recording medium such as a CD or a DVD, is read by a predetermined reader (not illustrated), and is stored in the storage unit 72. However, the operation assistance program may be downloaded to the operation device 17 from a server (not illustrated) via the communication network and stored in the storage unit 72. The operation assistance program may be stored in the storage unit 12 of the work vehicle 10. In addition, the storage unit 72 may store the data on the target route R that is generated in the operation device 17.

The operation control unit 71 has control devices such as a CPU, ROM, and RAM. The CPU is the processor that executes the various types of the arithmetic processing. The ROM is the non-volatile storage unit that stores, in advance, the control programs such as the BIOS and the OS for causing the CPU to execute the various types of the arithmetic processing. The RAM is the volatile or non-volatile storage unit that stores the various types of the information, and is used as the transient storage memory (the workspace) for the various types of the processing executed by the CPU. Then, when the CPU executes the various control programs, which are stored in the ROM or the storage unit 72 in advance, the operation control unit 71 controls the operation device 17.

More specifically, as illustrated in FIG. 1, the operation control unit 71 includes various processing units such as a display processing unit 711, an acceptance processing unit 712, and a setting processing unit 713. The operation device 17 functions as each of the various processing units when the CPU executes the respective processing according to the operation assistance program. Some or all of the processing units may each be constructed of an electronic circuit. The operation assistance program may be a program that causes plural processors to function as the processing units.

The display processing unit 711 causes the operation display unit 73 to display the various types of the information. For example, the display processing unit 711 causes the operation display unit 73 to display: any of the setting screens (FIGS. 10A, 10B to FIGS. 13A, 13B, 13C, and the like) on which various settings are made; any of work screens D1 (FIG. 8, FIG. 9, and the like) including the travel information of the work vehicle 10 such as a travel status and the work status; and the like. The display processing unit 711 is an example of each of the first display processing unit and the second display processing unit in the present invention.

The acceptance processing unit 712 accepts the various operations by the operator. For example, on the setting screen, the acceptance processing unit 712 accepts, from the operator, an operation to set a display target (the travel information) to be displayed the work screen D1.

Figure 7:
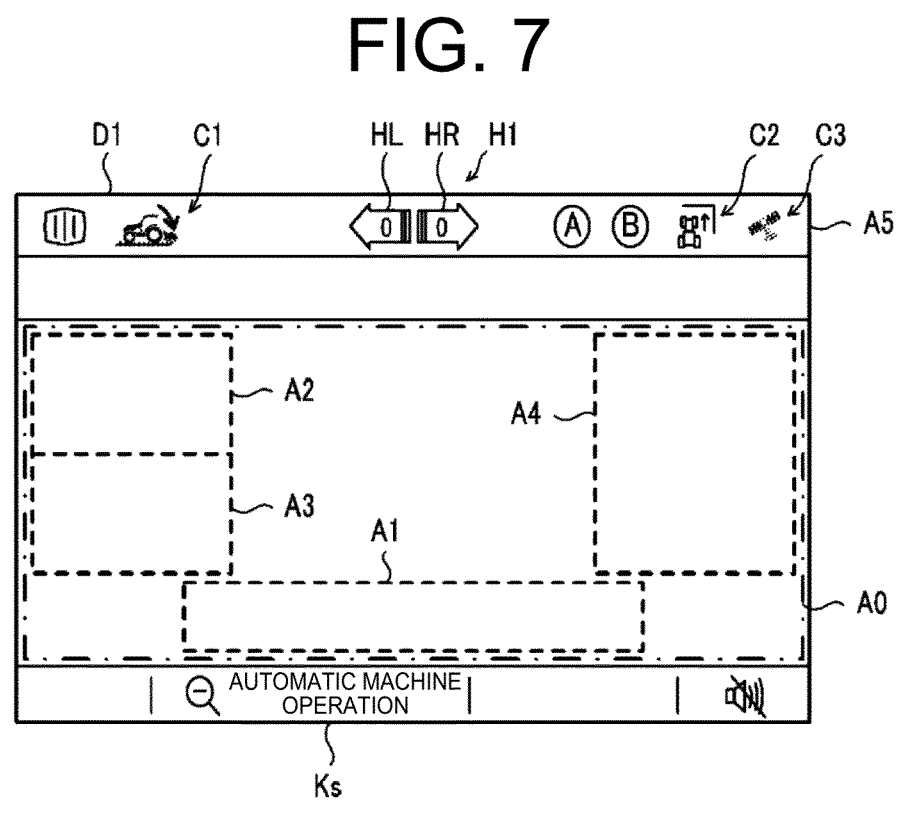

A description will herein be made on a specific configuration of the work screen D1. FIG. 7 illustrates plural display areas A0 to A4 that are set on the work screen D1. The operation control unit 71 sets the display areas A0 to A4 in advance for the display screen (the work screen D1). The display area A0 is an entire area where the location of the work vehicle 10, the target route R, and the like can be displayed. The display area A0 includes the plural display areas A1 to A4. For example, the display area A1 is arranged in a lower portion of the display area A0, the display area A2 and the display area A3 are aligned vertically in a left portion of the display area A0, and the display area A4 is arranged in a right portion of the display area A0. Just as described, the display areas A1 to A4 are arranged in a manner to be partially superimposed on the display area A0. The arrangement locations of the display areas A1 to A4 are not limited to the locations illustrated in FIG. 7. In addition, the arrangement locations and ranges of the display areas A1 to A4 may be changeable according to the operator's operation. Furthermore, the display areas A0 to A4 may be arranged in a manner not to overlap each other.

In the work screen D1, text information indicating the travel status of the work vehicle 10 (for example, "CURRENTLY ASSISTING STRAIGHT TRAVEL") is displayed above the display areas A0 to A4. In an uppermost display area A5 of the work screen D1, icon images representing the travel status, a setting status, and the like of the work vehicle 10 are displayed.

For example, an icon image C1 is an image representing whether to link a function of an instruction to start the autonomous travel with an operation tool (for example, a lifting/lowering lever of the work machine 14). For example, in the case where the operator lowers the lifting/lowering lever when the icon image C1 is lit, the work vehicle 10 starts the autonomous travel and lowers the work machine 14 to start the work. In the case where the icon image C1 is unlit, the work vehicle 10 does not start the autonomous travel and only performs operation to lower the work machine 14 even when the operator lowers the lifting/lowering lever. The operator may perform the operation (an ON/OFF operation) of whether to link an autonomous travel start function with the operation tool on the setting screen (not illustrated) or in a selection section Ks of the work screen D1.

An icon image H1 is an image representing a correction amount (an offset amount) when the operator performs the offset operation (the correction operation) to correct the location deviation between the work vehicle 10 and the target route R. When the operator performs, on the operation display unit 73, an operation to offset the work vehicle 10 to the right, the offset amount is displayed in a right icon image HR. When the operator performs, on the operation display unit 73, an operation to offset the work vehicle 10 to the left, the offset amount is displayed in a left icon image HL.

An icon image C2 is an image representing that the work vehicle 10 during the autonomous travel is arriving at an end point (the end Pe (see FIG. 5C)) of the straight route. The icon image C2 is lit when the work vehicle 10 approaches the end point.

An icon image C3 is an image representing a state of positioning accuracy (location accuracy) of the work vehicle 10. For example, the icon image C3 is displayed in a color that corresponds to the state of the positioning accuracy. In other words, the display processing unit 711 may change a display mode of each of the icon images according to a travel state of the work vehicle 10.

Here, the setting processing unit 713 sets the display target (the travel information) for each of the display areas A1 to A4. More specifically, when the acceptance processing unit 712 accepts, from the operator, an operation to select the display target for the display area on the setting screen, the setting processing unit 713 executes processing to register the display target selected by the operator in association with the display area. The display processing unit 711 causes the operation display unit 73 to display the work screen D1 on the basis of setting information that is set (registered) by the setting processing unit 713.

Figure 8:
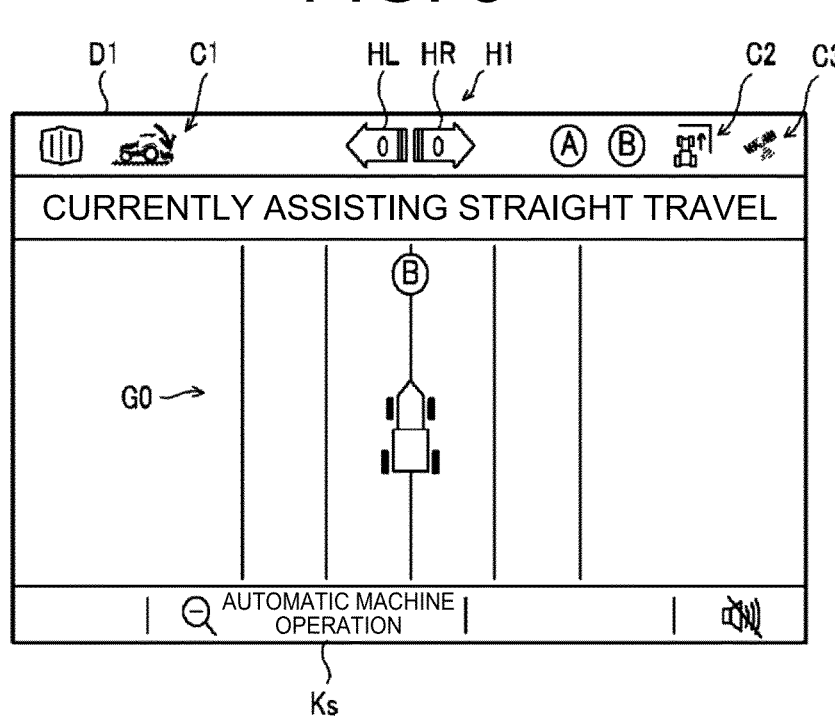
FIG. 8 is a view illustrating an example of the work screen that is displayed in the operation device according to the embodiment of the present invention.
Figure 9:
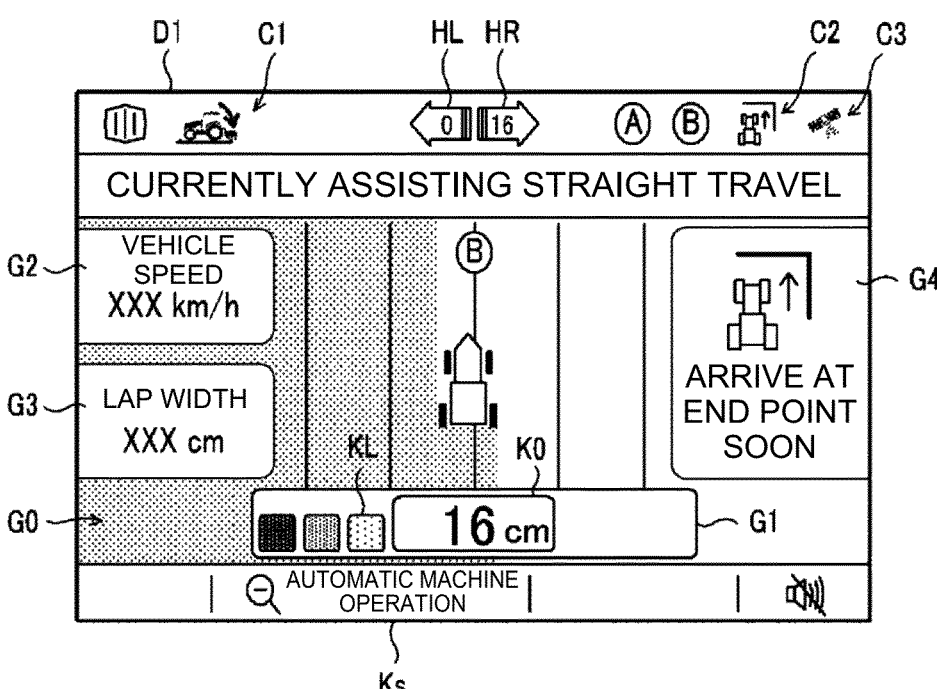
FIG. 9 is a view illustrating an example of the work screen that is displayed in the operation device according to the embodiment of the present invention.

FIG. 8 and FIG. 9 each illustrate an example of the work screen D1 during the autonomous travel of the work vehicle 10. On the work screen D1 illustrated in FIG. 8, travel information G0 is displayed in the display area A0 (see FIG. 7), but the travel information is not displayed in the display areas A1 to A4 (see FIG. 7). The travel information G0 includes the location of the work vehicle 10 with respect to the target route R (the straight route), the target route R (the plural parallel lines), the point B that corresponds to the end point, and the like. The display processing unit 711 displays the travel information G0 (first information) on the location of the work vehicle 10 in the display area A0.

Meanwhile, on the work screen D1 illustrated in FIG. 9, the travel information G0, which includes the location of the work vehicle 10, the target route R, the point B, the worked area, and the like, is displayed in the display area A0, travel information G1 indicating the location deviation between the work vehicle 10 and the target route R is displayed in the display area A1, travel information G2 indicating the vehicle speed of the work vehicle 10 is displayed in the display area A2, travel information G3 indicating the lap width of the work vehicle 10 is displayed in the display area A3, and travel information G4 (the guidance information and operation guidance information) indicating that the work vehicle 10 is approaching the end point is displayed in the display area A4. Here, the display processing unit 711 displays a location deviation K0 ("16 cm" in FIG. 9) in the travel information G1 on the basis of the position information, which is acquired from the vehicle controller 11, and the like, and displays an identification image KL according to a magnitude and a direction of the location deviation K0 (on a left side in FIG. 9). Just as described, the display processing unit 711 displays the travel information G0 at a center of the work screen D1 in the display area A0, displays the travel information G1 at the lower center of the work screen D1 in the display area A0, displays the travel information G2 and the travel information G3 on the left side of the center of the work screen D1 in the display area A0, and displays the travel information G4 on the right side of the center of the work screen D1 in the display area A0.

According to the work screen D1 illustrated in FIG. 9, since the various types of the travel information G1 to G4 are displayed in the display areas A1 to A4, such information is useful for the inexperienced operator, for example. In this way, the operator can appropriately operate the work vehicle 10, and thus work accuracy can be improved. Meanwhile, according to the work screen D1 illustrated in FIG. 8, since the travel information G1 to G4 is not displayed in the display areas A1 to A4, it is possible to reduce a chance that the skilled operator is bothered by the unnecessary information, for example. By the way, when displaying the travel information G1 to G4, the operation control unit 71 may audibly output (provide voice guidance of) the contents corresponding to the travel information G1 to G4. For example, the operation control unit 71 may audibly output a display content of the travel information G4 at timing at which the display content is switched, and may audibly output a display content of each of the travel information G1 to G3 at timing at which a set value is changed, at timing at which a change amount exceeds a predetermined amount, or at timing at which the display content is switched.

Just as described, the setting processing unit 713 can switch between the setting to display the travel information G1 to G4 on the travel state of the work vehicle 10 in the display areas A1 to A4 included in the work screen D1 and the setting not to display the travel information G1 to G4 in the display areas A1 to A4.

The acceptance processing unit 712 can accept, from the operator, an operation for the setting to display the travel information G1 to G4 in the display areas A1 to A4 (a first setting operation) or an operation for the setting not to display the travel information G1 to G4 in the display areas A1 to A4 (a second setting operation).

The setting processing unit 713 can be configured to display the travel information G0 in the display area A0 and display the travel information G1 to G4 in the display areas A1 to A4 when accepting the first setting operation from the operator, and can be configured to display the travel information G0 in the display area A0 but not to display the travel information G1 to G4 in the display areas A1 to A4 when accepting the second setting operation from the operator.

In regard to the operation device 17 according to the present embodiment, the operator can freely customize the display contents of the work screen D1. Thus, it is possible to improve convenience and operability of the operation device 17. Here, the display area A0 is an example of the first display area in the present invention, each of the display areas A1 to A4 is an example of the second display area in the present invention, and the display area A5 is an example of the third display area in the present invention. In addition, the travel information G0 is an example of the first information in the present invention, and each of the travel information G1 to G4 is an example of the second information in the present invention.

[Specific Example of Setting Method]

Next, a description will be made on a specific example of a setting method for setting the display target (the travel information) for each of the display areas A1 to A4 in the work screen D1.

Figure 10A:
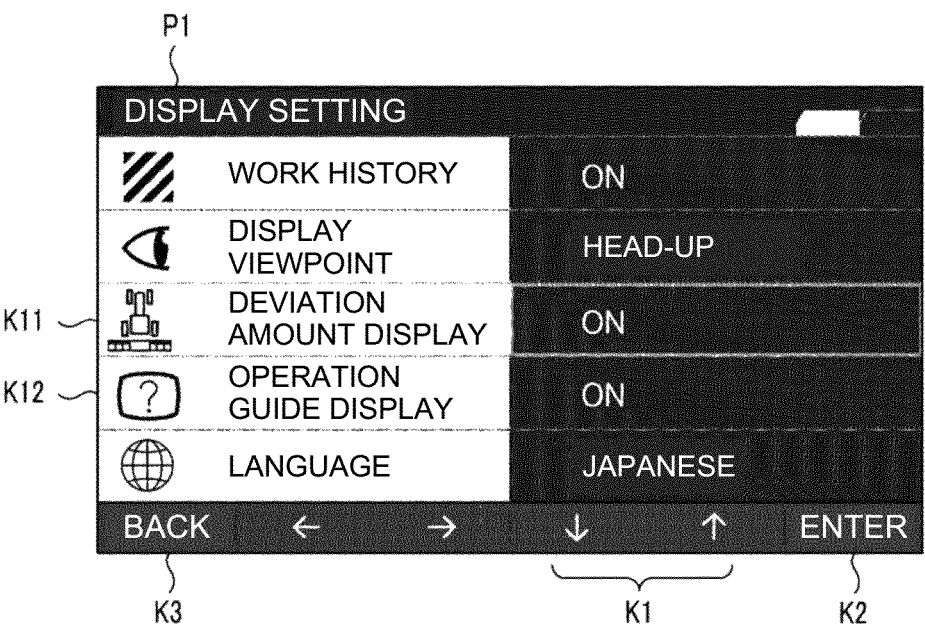
FIG. 10A is a view illustrating an example of a setting screen that is displayed in the operation device according to the embodiment of the present invention.

FIG. 10A illustrates an example of a setting screen P1. For example, when the operator selects a display setting (not illustrated) on a menu screen at the time of performing a display target setting operation, the display processing unit 711 displays the setting screen P1. The setting screen P1 includes: a setting item ("WORK HISTORY") to select whether to display the worked area (see the travel information G0 in FIG. 9) in the display area A0 (see FIG. 7); a setting item K11 ("DEVIATION AMOUNT DISPLAY") to select whether to display the location deviation K0 (the travel information G1 in FIG. 9) in the display area A1 (see FIG. 7); a setting item K12 ("OPERATION GUIDE DISPLAY") to select whether to display the guidance information (the operation guidance information) (the travel information G4 in FIG. 9) in the display area A4 (see FIG. 7); and the like. The operator can move a selection position of the setting item or a display page by pressing an operation button K1, can select the setting item by pressing an enter button K2, and can move the display page to the previous page by pressing a back button K3. Each of the buttons K1 to K3 is an example of the operation unit in the operation display unit 73.

Figure 10B:
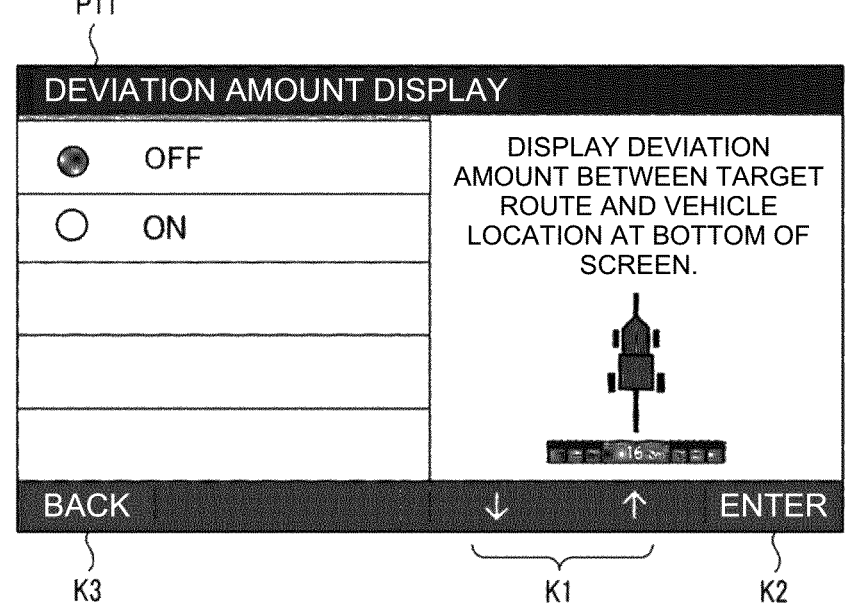
FIG. 10B is a view illustrating an example of the setting screen that is displayed in the operation device according to the embodiment of the present invention.

When the operator selects the setting item K11, the display processing unit 711 displays a setting screen P11 illustrated in FIG. 10B. The display processing unit 711 displays a selection field for selecting ON/OFF of the display of the location deviation K0 and explanatory information about the location deviation K0 on the setting screen P11. The operator selects ON and presses the enter button K2 when the operator wishes to display the travel information G1 on the location deviation K0 (see FIG. 9) on the work screen D1. On the other hand, when the operator does not wish to display the travel information G1 on the work screen D1, the operator selects OFF and presses the enter button K2. The operation in which the operator selects ON is an example of the first setting operation in the present invention, and the operation in which the operator selects OFF is an example of the second setting operation in the present invention.

When the acceptance processing unit 712 accepts the operator's selection operation, the setting processing unit 713 sets the display content of the display area A1 on the basis of the selection operation (an ON/OFF operation). In the example illustrated in FIG. 10B, since the operator selects ON, the setting processing unit 713 registers the travel information G1 in association with the display area A1.

Figure 11A:
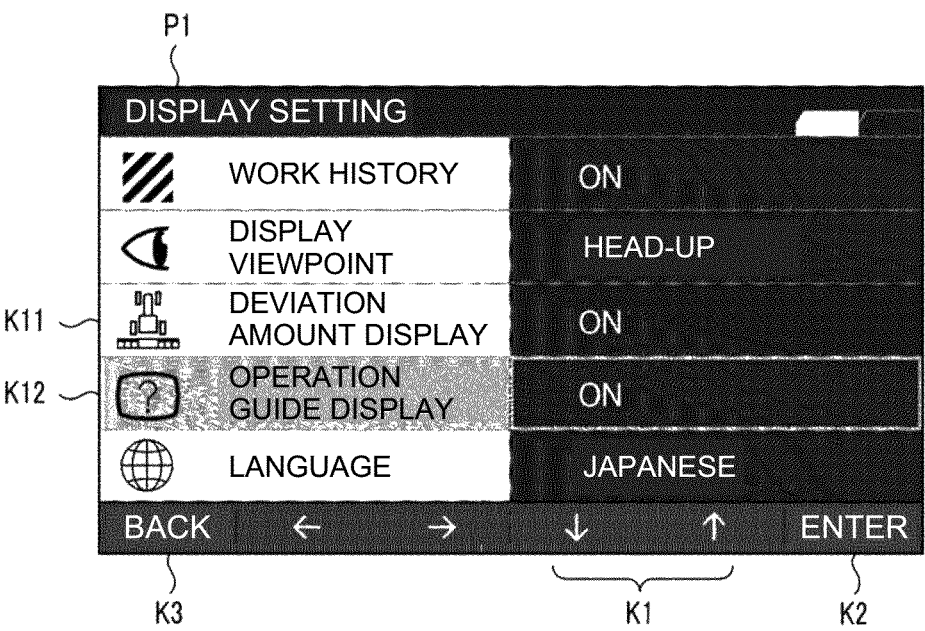
FIG. 11A is a view illustrating an example of the setting screen that is displayed in the operation device according to the embodiment of the present invention.
Figure 11B:
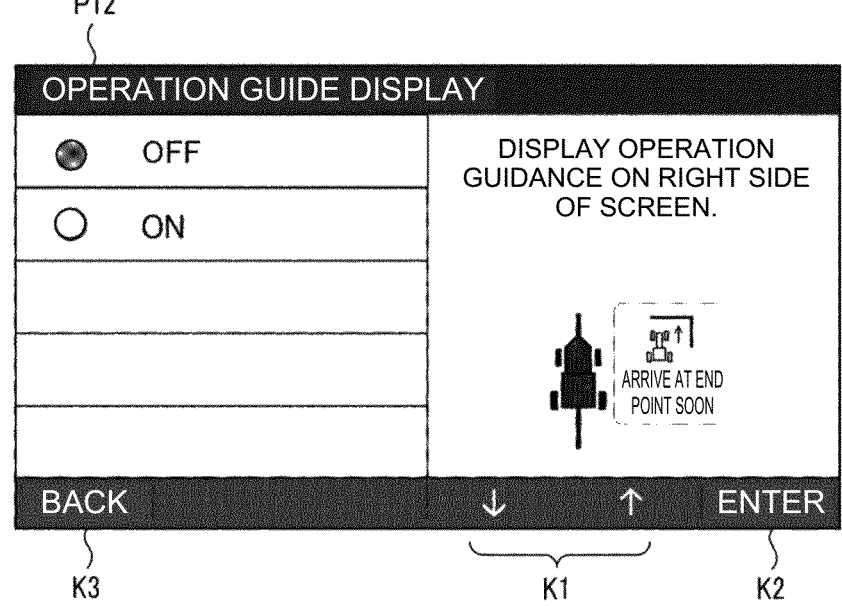
FIG. 11B is a view illustrating an example of the setting screen that is displayed in the operation device according to the embodiment of the present invention.

Next, when the operator returns to the setting screen P1 (see FIG. 11A) and selects the setting item K12 that corresponds to the travel information G4 (see FIG. 9) in the display area A4 (see FIG. 7), the display processing unit 711 displays a setting screen P12 illustrated in FIG. 11B. The display processing unit 711 displays a selection field for selecting ON/OFF of the display of the travel information G4 and explanatory information about the travel information G4 on the setting screen P12. When the operator wishes to display the travel information G4 (see FIG. 9) on the work screen D1, the operator selects ON and presses the enter button K2. On the other hand, when the operator does not wish to display the travel information G4 on the work screen D1, the operator selects OFF and presses the enter button K2.

When the acceptance processing unit 712 accepts the operator's selection operation, the setting processing unit 713 sets the display content of the display area A4 on the basis of the selection operation (the ON/OFF operation). In the example illustrated in FIG. 11B, since the operator selects ON, the setting processing unit 713 registers the travel information G4 in association with the display area A4.

Figure 12A:
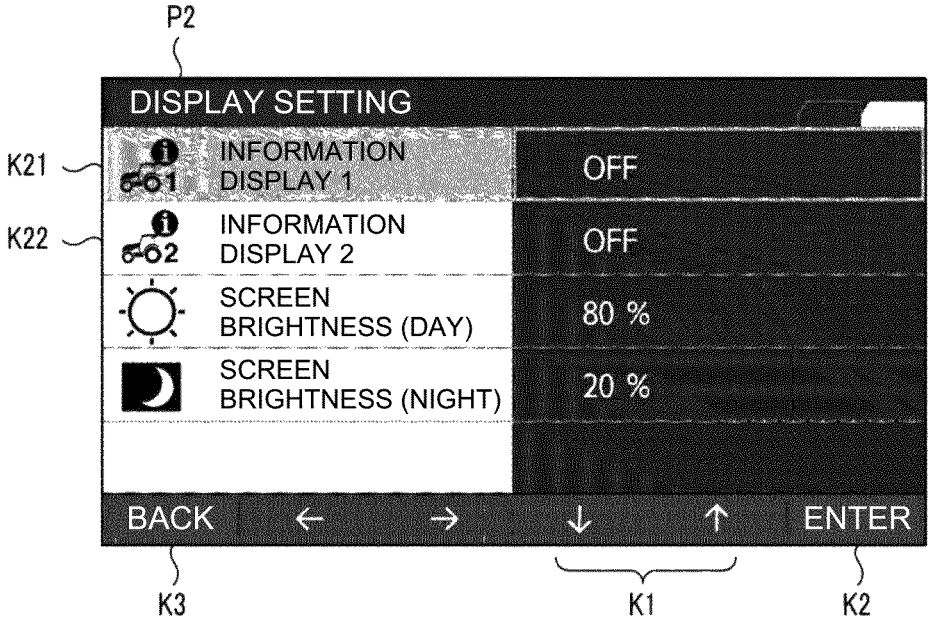
FIG. 12A is a view illustrating an example of the setting screen that is displayed in the operation device according to the embodiment of the present invention.

Next, when the operator returns to the setting screen P1 (see FIG. 10A) and presses the back operation button K1 to scroll the page, the display processing unit 711 displays a setting screen P2 illustrated in FIG. 12A. The setting screen P2 includes: a setting item K21 ("INFORMATION DIS- PLAY 1") for selecting whether to display the travel information G2 (see FIG. 9) in the display area A2 (see FIG. 7) and for selecting the display target to be displayed in the display area A2; a setting item K22 ("INFORMATION DISPLAY 2") for selecting whether to display the travel information G3 (see FIG. 9) in the display area A3 (see FIG. 7) and for selecting the display target to be displayed in the display area A3; and the like.

Figure 12B:
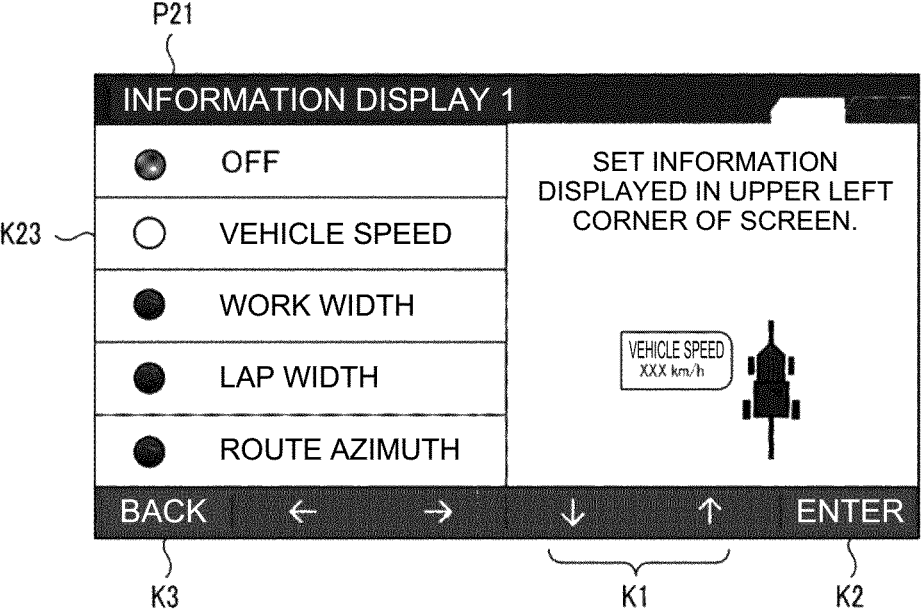
FIG. 12B is a view illustrating an example of the setting screen that is displayed in the operation device according to the embodiment of the present invention.
Figure 12C:
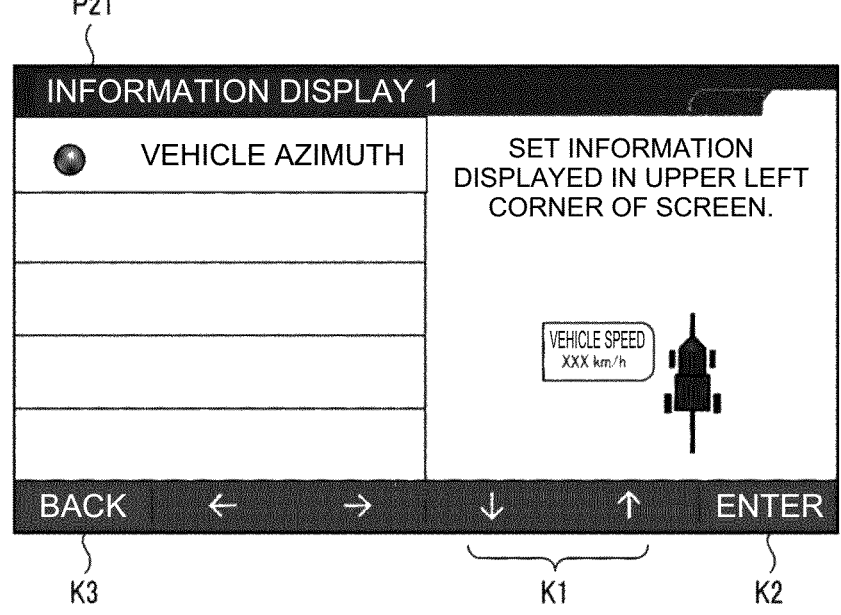
FIG. 12C is a view illustrating an example of the setting screen that is displayed in the operation device according to the embodiment of the present invention.

When the operator selects the setting item K21, the display processing unit 711 displays a setting screen P21 illustrated in FIG. 12B. The display processing unit 711 displays a selection field for selecting OFF of the display of the travel information G2, selection fields of the plural display targets, and explanatory information corresponding to each of the selection fields on the setting screen P21. The plural display targets include "VEHICLE SPEED", "WORK WIDTH", "LAP WIDTH", "ROUTE AZIMUTH", "VEHICLE AZIMUTH" (see FIG. 12C), and the like. "VEHICLE AZIMUTH" is displayed on the next page (see FIG. 12C) of the display page illustrated in FIG. 12B. Here, the operator selects a setting item K23 "VEHICLE SPEED" and presses the enter button K2. When the acceptance processing unit 712 accepts the operator's selection operation, the setting processing unit 713 registers the display target in association with the display area A2 where the travel information G2 is displayed. In the example illustrated in FIG. 12B, since the operator selects "VEHICLE SPEED", the setting processing unit 713 registers the travel information G2 of "VEHICLE SPEED" in association with the display area A2. Here, the operation in which the operator selects any of the plural display targets is an example of the first setting operation in the present invention.

Figure 13A:
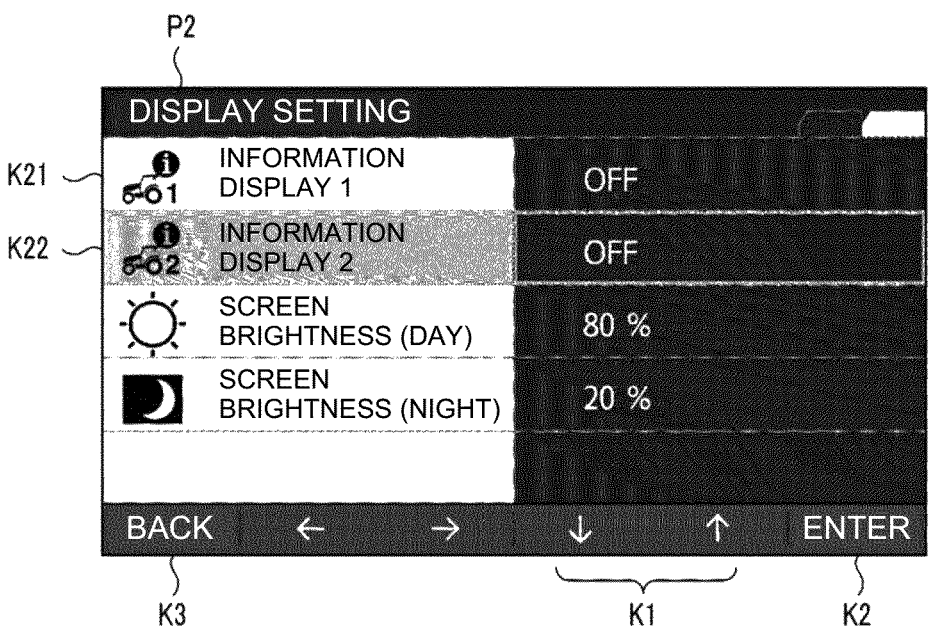
FIG. 13A is a view illustrating an example of the setting screen that is displayed in the operation device according to the embodiment of the present invention.
Figure 13B:
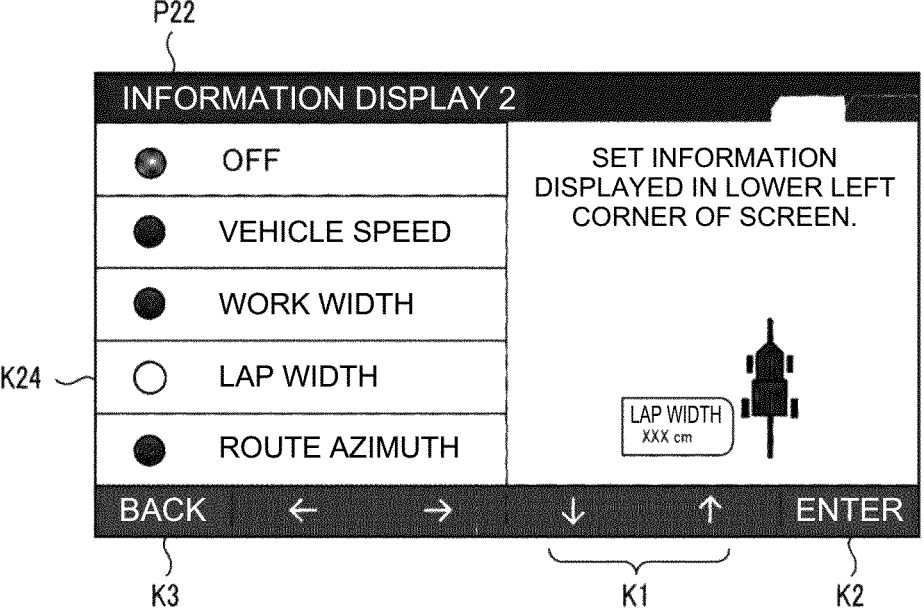
FIG. 13B is a view illustrating an example of the setting screen that is displayed in the operation device according to the embodiment of the present invention.
Figure 13C:
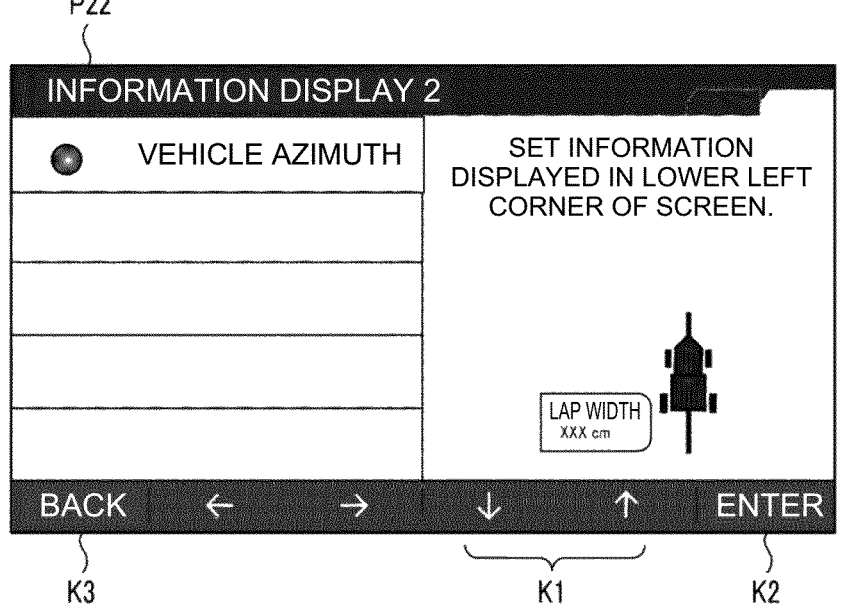
FIG. 13C is a view illustrating an example of the setting screen that is displayed in the operation device according to the embodiment of the present invention.

Next, when the operator returns to the setting screen P2 and selects the setting item K22 that corresponds to the travel information G3 (see FIG. 9) in the display area A3 (see FIG. 7) (see FIG. 13A), the display processing unit 711 displays a setting screen P22 illustrated in FIG. 13B. The display processing unit 711 displays a selection field for selecting OFF of the display of the travel information G3, the selection fields of the plural display targets, and the explanatory information corresponding to each of the selection fields on the setting screen P22. The plural display targets include "VEHICLE SPEED", "WORK WIDTH", "LAP WIDTH", "ROUTE AZIMUTH", "VEHICLE AZIMUTH" (see FIG. 13B and FIG. 13C), and the like. In the present embodiment, the plural selectable display targets corresponding to the information display 1 (the display area A2) (see FIG. 12B and FIG. 12C) are the same as the plural selectable display targets corresponding to the information display 2 (the display area A3) (see FIG. 13B and FIG. 13C). However, as another embodiment, the plural selectable display target may differ between the display area A2 and the display area A3.

Here, the operator selects a setting item K24 "LAP WIDTH" and presses the enter button K2 (see FIG. 13B). When the acceptance processing unit 712 accepts the operator's selection operation, the setting processing unit 713 registers the display target in association with the display area A3 where the travel information G3 is displayed. In the example illustrated in FIG. 13B, since the operator selects "LAP WIDTH", the setting processing unit 713 registers the travel information G3 of "LAP WIDTH" in association with the display area A3.

When the operator sets "ON" the setting item "WORK HISTORY" on the setting screen P1 (see FIG. 10A), the setting processing unit 713 registers the travel information G0 (see FIG. 9) of the worked area (the work history) in association with the display area A0.

As described so far, the setting processing unit 713 sets the display contents of the work screen D1 according to the operator's setting operation. In the case where the setting processing unit 713 executes the setting processing as in the above-described example, the display processing unit 711 causes the operation display unit 73 to display the work screen D1 illustrated in FIG. 9 during the autonomous travel of the work vehicle 10. That is, the display processing unit 711 displays the travel information G0, which includes the location of the work vehicle 10, the target route R, the point B, and the worked area, in the display area A0, displays the travel information G1 indicating the location deviation K0 in the display area A1, displays the travel information G2 indicating the vehicle speed of the work vehicle 10 in the display area A2, displays the travel information G3 indicating the lap width of the work vehicle 10 in the display area A3, and displays the travel information G4 indicating that the work vehicle 10 is approaching the end point in the display area A4.

Just as described, the operation control unit 71 can display mutually different types of the travel information on the travel state of the work vehicle 10 in the plural display areas. The travel information may include information that corresponds to each of the plural setting items related to the travel state of the work vehicle 10. When accepting the operation to select any of the plural setting items from the operator, the display processing unit 711 displays the travel information that corresponds to the selected setting item in the display area.

As another embodiment, the operation control unit 71 may be configured not to accept the selection operation of the setting item (see FIG. 12B), which is selected for "INFORMATION DISPLAY 1" (the display area A2), on the setting screen P22 (see FIG. 13B) of "INFORMATION DISPLAY 2" (the display area A3), for example, such that the display contents of the travel information G2 and the travel information G3 (see FIG. 9) are not the same. For example, in the case where the operator selects "VEHICLE SPEED" on the setting screen P21 illustrated in FIG. 12B, the operation control unit 71 hides or gray outs the setting item "VEHICLE SPEED" on the setting screen P22 illustrated in FIG. 13B.

As further another embodiment, the operation control unit 71 may display the setting item, which is selected in FIG. 12B, to be identifiable on the setting screen P22 illustrated in FIG. 13B. For example, in the case where the operator selects "VEHICLE SPEED" on the setting screen P21 illustrated in FIG. 12B, the operation control unit 71 displays identification information (a message of "SELECTED" or the like) in the setting item "VEHICLE SPEED" on the setting screen P22 illustrated in FIG. 13B.

[Operation Assistance Processing]

Figure 14:
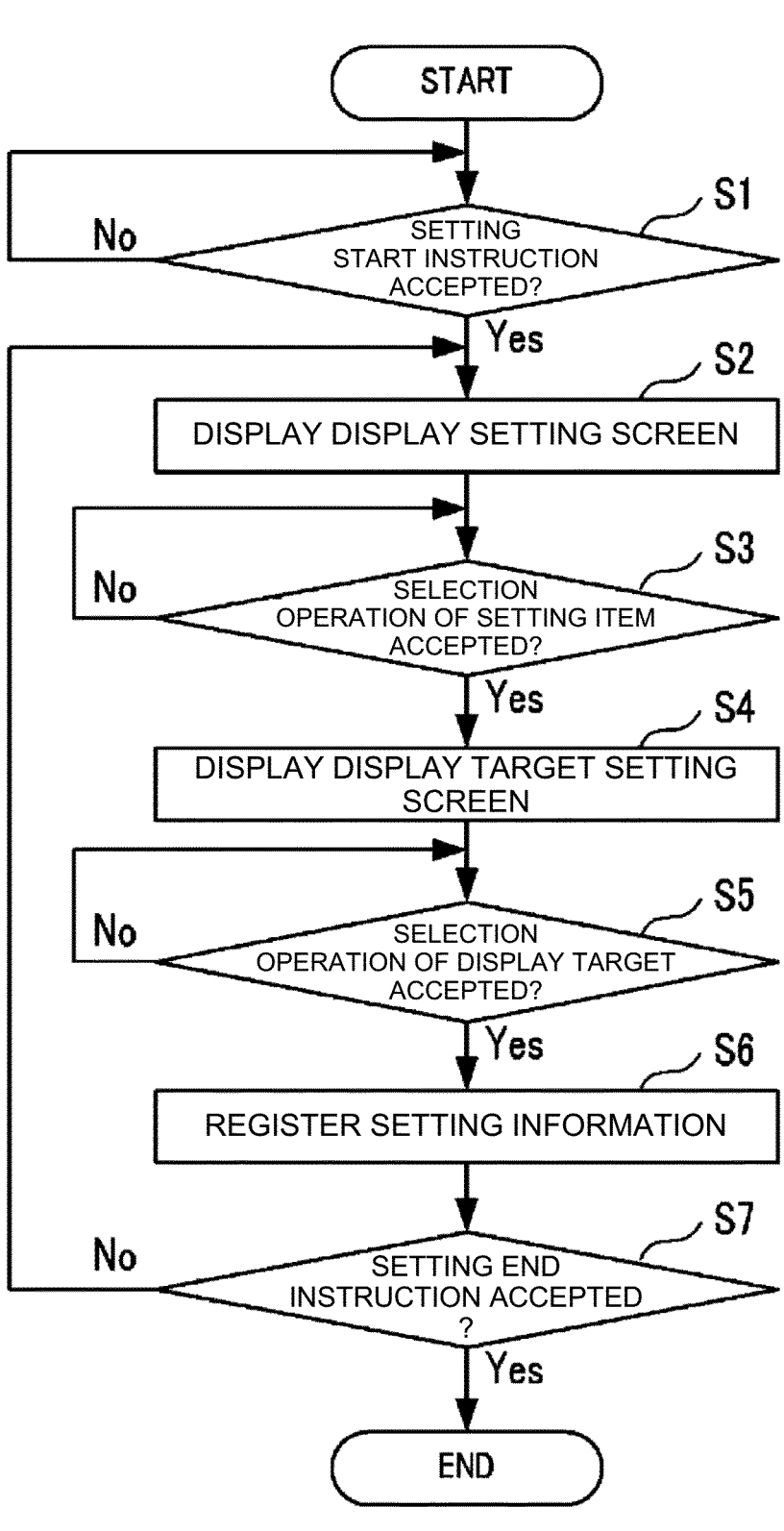
FIG. 14 is a flowchart illustrating an exemplary procedure for operation assistance processing that is executed by the operation device according to the embodiment of the present invention.

A description will hereinafter be made on an example of the operation assistance processing that is executed by the operation control unit 71 of the operation device 17 with reference to FIG. 14. The present invention may be comprehended as the invention of the operation assistance method by which the operation device 17 partially or entirely executes the operation assistance processing or the invention of the operation assistance program for causing the operation device 17 to partially or entirely execute the operation assistance method. One or plural processors may execute the operation assistance processing.

In step S1, the operation control unit 71 determines whether a start instruction of the setting operation has been accepted from the operator. For example, the operator selects the display setting (not illustrated) on the menu screen when setting the travel information to be displayed on the work screen D1. If the operation control unit 71 has accepted the selection operation of the display setting (a setting start instruction) from the operator (S1: Yes), the processing proceeds to step S2. The operation control unit 71 stands by until accepting the setting start instruction from the operator (S1: No).

In step S2, the operation control unit 71 displays the setting screen P1. For example, the operation control unit 71 causes the operation display unit 73 to display the setting screen P1 illustrated in FIG. 10A. For example, the setting screen P1 illustrated in FIG. 10A includes: the setting item K11 "DEVIATION AMOUNT DISPLAY" that corresponds to the location deviation K0; and the setting item K12 "OPERATION GUIDE DISPLAY" that corresponds to the guidance information (the operation guidance information).

In step S3, the operation control unit 71 determines whether the selection operation of the setting item has been accepted from the operator. For example, the operator selects the setting item K11 on the work screen D1 (see FIG. 10A). If the operation control unit 71 has accepted the selection operation of the setting item from the operator (S3: Yes), the processing proceeds to step S4. The operation control unit 71 stands by until accepting the selection operation of the setting item from the operator (S3: No).

In step S4, the operation control unit 71 displays the display target setting screen. For example, when the operator selects the setting item K11 on the work screen D1 (see FIG. 10A), the operation control unit 71 displays the setting screen P11 illustrated in FIG. 10B. The operation control unit 71 displays the selection field for selecting ON/OFF of the display of the location deviation K0 on the setting screen P11.

In step S5, the operation control unit 71 determines whether the selection operation of the display target has been accepted. For example, the operation control unit 71 accepts the operator's selection operation on the setting screen P11 illustrated in FIG. 10B. If the operation control unit 71 has accepted the selection operation from the operator (S5: Yes), the processing proceeds to step S6. The operation control unit 71 stands by until accepting the selection operation from the operator (S5: No). For example, when the operator wishes to display the travel information G1 on the location deviation K0 (see FIG. 9) on the work screen D1, the operator selects ON and presses the enter button K2. On the other hand, when the operator does not wish to display the travel information G1 on the work screen D1, the operator selects OFF and presses the enter button K2.

In Step S6, the operation control unit 71 registers the setting information. For example, when the operator selects ON on the setting screen P11 illustrated in FIG. 10B, the operation control unit 71 registers the travel information G1 in association with the display area A1. Meanwhile, for example, when the operator selects OFF on the setting screen P11 illustrated in FIG. 10B, the operation control unit 71 does not associate the travel information with the display area A1 or registers a non-display flag in association with the display area A1.

In step S7, the operation control unit 71 determines whether a setting operation end instruction has been accepted from the operator. For example, when the operator performs an operation to start the autonomous travel on the menu screen, the operation control unit 71 accepts the setting operation end instruction. If the operation control unit 71 has accepted the end instruction from the operator (S7: Yes), the operation control unit 71 terminates the operation assistance processing. On the other hand, if the operation control unit 71 has not accepted the end instruction from the operator (S7: No), the processing proceeds to step S2.

For example, if the operator performs the operation to return to the setting screen P1 (S7: No), in step S2, the operation control unit 71 displays the setting screen P1 (see FIG. 11A). If the operator selects the setting item K12 on the setting screen P1 (S3: Yes), the operation control unit 71 displays the setting screen P12 illustrated in FIG. 11B (S4) and accepts the selection operation to select ON/OFF of the display of the travel information G4 (the operation guidance information) (S5). When the operator selects ON on the setting screen P12, the operation control unit 71 registers the travel information G4 in association with the display area A4 (S6).

Furthermore, if the operator performs the operation to return to the setting screen P1 and the operation to move to the next page (S7: No), the operation control unit 71 displays the setting screen P2 (see FIG. 12A) (S2). If the operator selects the setting item K21 on the setting screen P2 (S3: Yes), the operation control unit 71 displays the setting screen P21 illustrated in FIG. 12B (S4) and accepts the selection operation to select the display target (S5). When the operator selects "VEHICLE SPEED" (the setting item K23) on the setting screen P21, the operation control unit 71 registers vehicle speed information (the travel information G2) in association with the display area A2 (S6).

For example, if the operator performs the operation to return to the setting screen P2 (S7: No), in step S2, the operation control unit 71 displays the setting screen P2 (see FIG. 13A). If the operator selects the setting item K22 on the setting screen P2 (S3: Yes), the operation control unit 71 displays the setting screen P22 illustrated in FIG. 13B (S4) and accepts the selection operation to select the display target (S5). When the operator selects "LAP WIDTH" on the setting screen P22, the operation control unit 71 registers lap width information (the travel information G3) in association with the display area A3 (S6).

If the operator terminates the display setting operation for the display areas A0 to A4 (S7: Yes), the operation control unit 71 terminates the operation assistance processing. The operation control unit 71 executes the operation assistance processing every time the operation control unit 71 accepts the start instruction of the setting operation by the operator. The operation control unit 71 can also execute the operation assistance processing during the autonomous travel of the work vehicle 10.

As it has been described so far, the operation device 17 according to the present embodiment causes the operation device 17, which is used for the travel operation of the work vehicle 10, to display the work screen D1, and displays the travel information G0 on the location of the work vehicle 10 in the display area A0 included in the work screen D1. In addition, the operation device 17 switches between the setting to display the travel information G0 to G4 on the travel state of the work vehicle 10 in the display areas A1 to A4 included in the work screen D1 and the setting not to display the travel information G0 to G4 in the display areas A1 to A4.

With the above configuration, it is possible to switch between the display and the non-display of the travel information G1 to G4, each of which is used to assist with the operator's operation, while displaying the travel information G0 on the location of the work vehicle 10. For example, during the operation of the work vehicle 10, the inexperienced operator can check the travel information G1 to G4 by selecting the setting to display the travel information G1 to G4. In addition, for example, the skilled operator can prevent the display of the unnecessary information during the operation of the work vehicle 10 by selecting the setting not to display the travel information G1 to G4. Therefore, it is possible to improve the convenience of the operation device 17. Here, the travel information G1 to G4 includes at least one of the information on the travel status of the work vehicle 10, the information on the work status of the work vehicle 10, and the guidance information (the operation guidance information).

Other Embodiments

The present invention is not limited to the above-described embodiment. A description will hereinafter be made on other embodiments of the present invention.

Figure 15A:
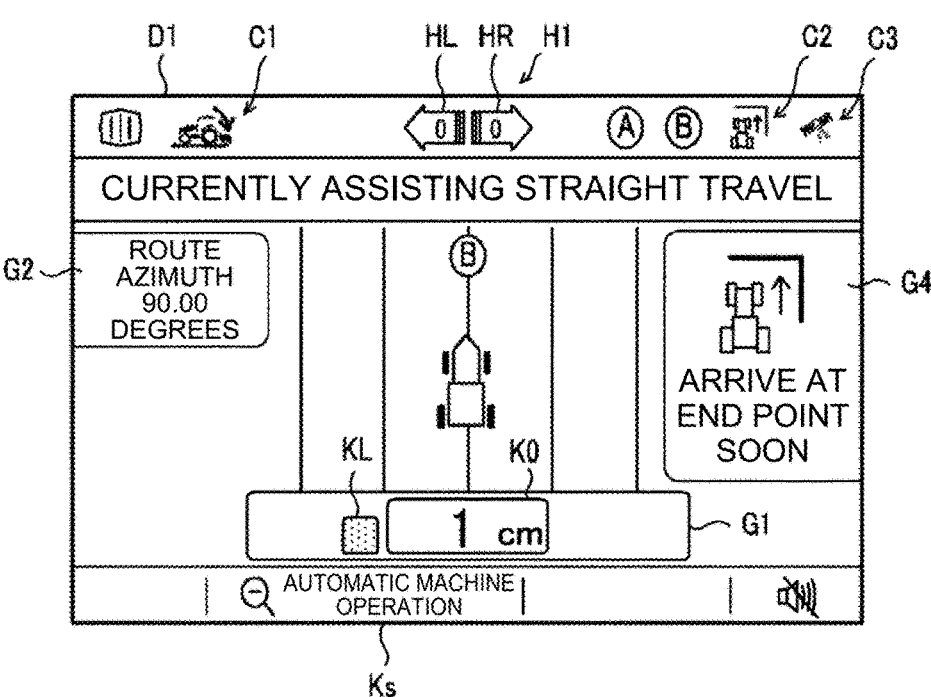
FIG. 15A is a view illustrating an example of the setting screen that is displayed in the operation device according to the embodiment of the present invention.

In the embodiment described above, as illustrated in FIG. 7, the display area A2 and the display area A3 are set in a manner to be aligned vertically in the left portion of the work screen D1, and the display target can be set in each of the display area A2 and the display area A3. Accordingly, for example, in the case where the operator sets "ROUTE AZIMUTH" for "INFORMATION DISPLAY 1" (the display area A2) and "OFF" for "INFORMATION DISPLAY 2" (the display area A3) on the setting screen P2 in FIG. 12A and FIG. 13A, as illustrated in the work screen D1 in FIG. 15A, the operation control unit 71 the travel information G2 indicating the route azimuth corresponding to the reference line L1 in the display area A2 and brings the display area A3 into a non-displayed state. Here, in the case where the operator sets the set azimuth, the operation control unit 71 displays the set azimuth as the route azimuth in the display area A2.

Figure 15B:
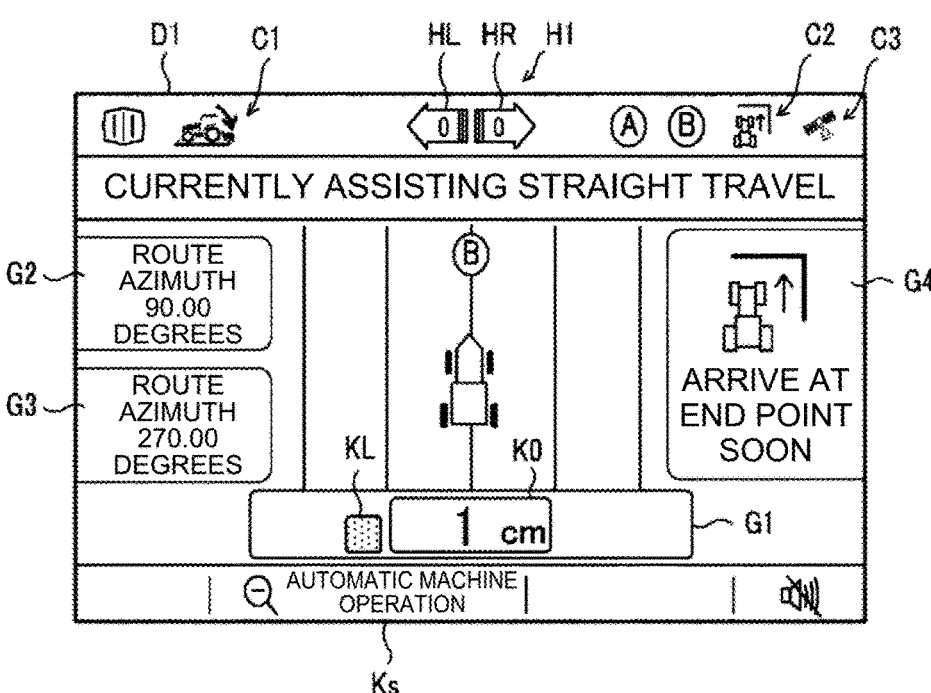
FIG. 15B is a view illustrating an example of the setting screen that is displayed in the operation device according to the embodiment of the present invention.

In the case of the above configuration, since nothing is displayed in the display area A3, the display area A3 becomes an empty space. For this reason, as another embodiment of the present invention, in the case where the display target is set in one of the display areas A2, A3 and the display target is not set in the other ("OFF"), the operation control unit 71 may display associated information that is associated with the display target in the other display area. For example, in the case where the operator sets the set azimuth to "90 DEGREES", as illustrated in FIG. 15B, the operation control unit 71 displays the travel information G2 indicating the route azimuth "90 DEGREES" in the display area A2 while displaying, in the display area A3, the travel information G3 indicating "270 DEGREES" in the same direction as the route azimuth "90 DEGREES". In regard to the set azimuth, the operator may set an angle "d1" for the reference line L1 or may set an angle "d1+180 DEGREES" for the reference line L1. With the above configuration, even when the operator sets any of the angles, both of the route azimuths can be displayed. Thus, the operator can comprehend at a glance whether the setting content set by himself/herself is reflected. Just as described, the operation control unit 71 may change the display content to be displayed in the display area according to the number of the display areas.

Figure 15C:
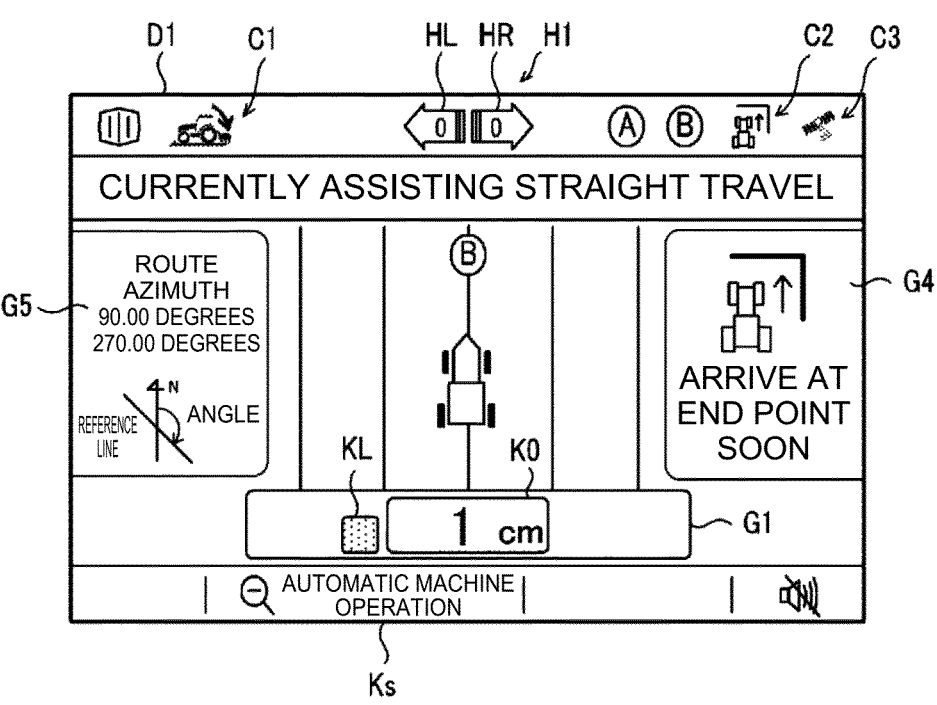
FIG. 15C is a view illustrating an example of the setting screen that is displayed in the operation device according to the embodiment of the present invention.

As illustrated in FIG. 15C, the operation control unit 71 may set a single display area where the display areas A2, A3 are integrated, and may display the travel information G5 including the associated information in the integrated display area. Just as described, the operation control unit 71 may change the display content to be displayed in the display area according to the size of the display area.

Figure 16:
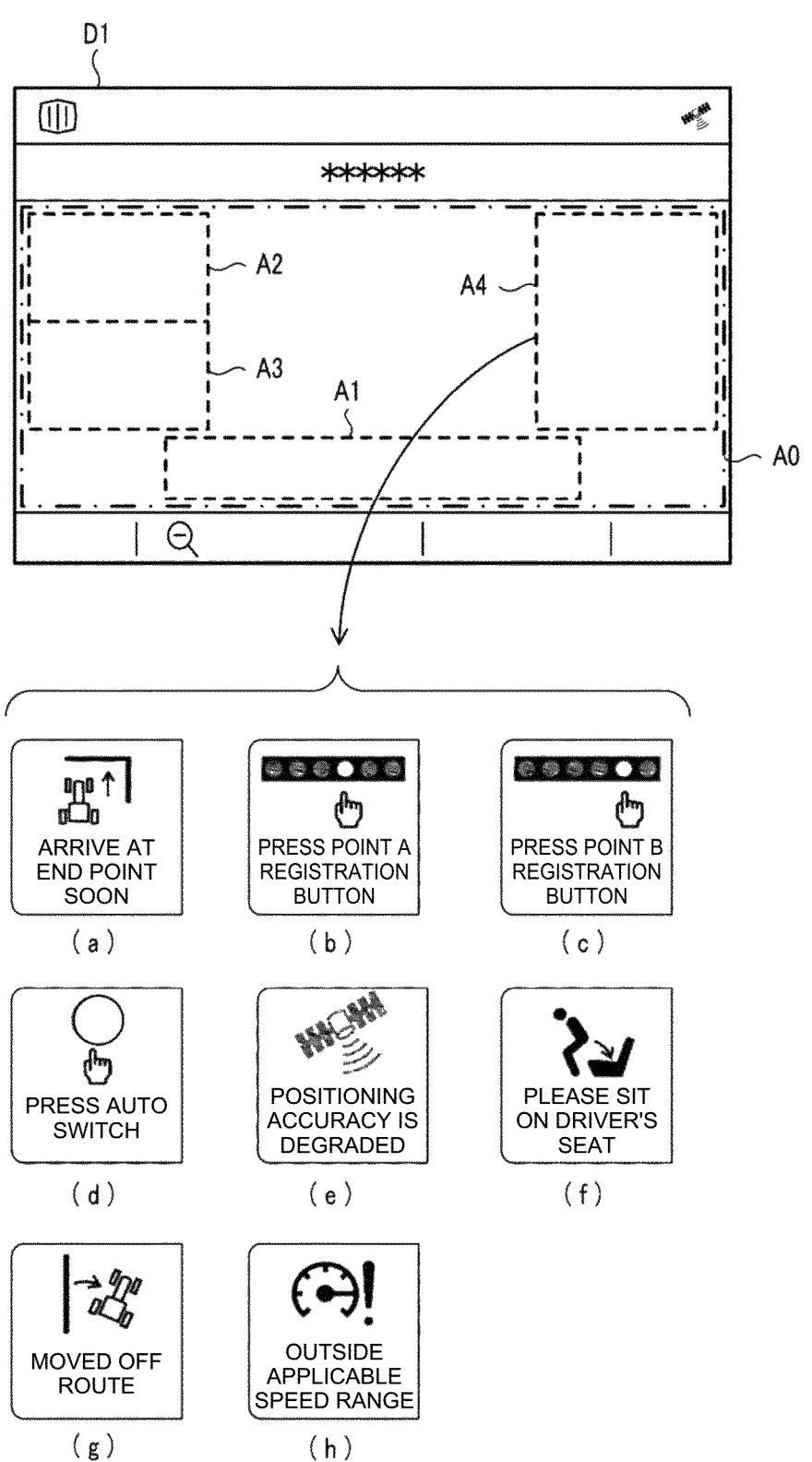
FIG. 16 is a view illustrating an example of guidance information that is displayed on the operation device according to the embodiment of the present invention.

In the embodiment described above, the single display target (the information indicating that the work vehicle 10 is approaching the end point) is exemplified as the travel information G4 (the guidance information) that corresponds to the display area A4 (see FIG. 11B). However, but the travel information G4 is not limited thereto. For example, as illustrated in FIG. 16, the operation control unit 71 may display each piece of the guidance information illustrated in (a) to (h) in the display area A4. For example, when the operator sets "OPERATION GUIDE DISPLAY" to "ON" (see FIG. 11A and FIG. 11B), the operation control unit 71 may switch the display target of the display area A4 according to the state of the work vehicle 10.

For example, when the work vehicle 10 travels autonomously and approaches the end point (the end of the straight route), the operation control unit 71 displays, in the display area A4 of the work screen D1, the guidance information (a) indicating that the work vehicle 10 arrives at the end point soon.

For example, when the operator generates the straight route (see FIG. 5A), the operation control unit 71 displays, in the display area A4 of the work screen D1, the guidance information (b), (c) that urge the registration operation of the point A and the point B.

For example, when the work vehicle 10 satisfies the autonomous travel start condition (see FIG. 5C), the operation control unit 71 displays, in the display area A4 of the work screen D1, the guidance information (d) that urges the user to the start instruction of the autonomous travel (pressing of the AUTO switch) (see FIG. 6A).

For example, when the location accuracy (the positioning accuracy) is degraded during the autonomous travel of the work vehicle 10, the operation control unit 71 displays, in the display area A4 of the work screen D1, the guidance information (e) indicating that the location accuracy is degraded.

For example, when the operator gets on the work vehicle 10 but is not seated on the driver's seat, the operation control unit 71 displays, in the display area A4 of the work screen D1, the guidance information (f) on the display area A4 of the work screen D1 that urges the operator to be seated.

For example, when the work vehicle 10 deviates from the target route R during the autonomous travel of the work vehicle 10, the operation control unit 71 displays, in the display area A4 of the work screen D1, the guidance information (g) indicating that the work vehicle 10 deviates from the target route R.

For example, when the vehicle speed of the work vehicle 10 exceeds a threshold value (an applicable vehicle speed), the operation control unit 71 displays the guidance information (h) indicating that the vehicle speed exceeds an applicable vehicle speed range.

Just as described, the operation control unit 71 may switch the display target (the guidance information) of the display area A4 according to the state of the work vehicle 10 (the setting status, the travel status, or the like). As another embodiment, on the setting screen, the operator may be able to select any one of the guidance information (a) to (h) as the display target to be displayed in the display area A4.

When displaying the guidance information (a) to (h), the operation control unit 71 may audibly output the contents corresponding to the guidance information (a) to (h). In addition, the operation control unit 71 may only provide the voice guidance even when the setting item K12 (see FIG. 11B) of "OPERATION GUIDE DISPLAY" is set to OFF. Furthermore, the operation control unit 71 may be able to switch ON/OFF of the voice guidance.

In the embodiment described above, it is configured that the operator selects the display target in each of the setting screens (see FIGS. 10A, 10B to FIGS. 13A, 13B, 13C). However, as another embodiment, for example, it may be configured that, in the work screen D1 illustrated in FIG. 16, the operator selects any of the display areas A0 to A4 to set the display target. For example, when the operator selects the display area A2 (a touch operation on a touch panel), the operation control unit 71 displays the setting screen P21 (see FIG. 12B and FIG. 12C) that corresponds to the display area A2, and accepts the selection operation of the display target from the operator. In addition, for example, when the operator selects the display area A3 (the touch operation on the touch panel), the operation control unit 71 displays the setting screen P22 (see FIG. 13B and FIG. 13C) that corresponds to the display area A3, and accepts the selection operation of the display target from the operator.

On the work screen D1 illustrated in FIG. 16, the operator may be able to change the position and the range of each of the display areas A0 to A4. For example, the operator may be able to select and move a rectangular frame of the display area A2 or change a range of the rectangular frame. Just as described, the operator may be able to customize the display position and the display range of each of the travel information G0 to G4.

The operation control unit 71 may change the display content to be displayed in the display area according to the size (the range) of the display area. For example, in the case where the display area is small, the operation control unit 71 displays a simplified version (basic information) of the travel information in the display area. In the case where the display area is large, the operation control unit 71 displays a detailed version (the basic information and associated information) of the travel information in the display area.

Figure 17A:
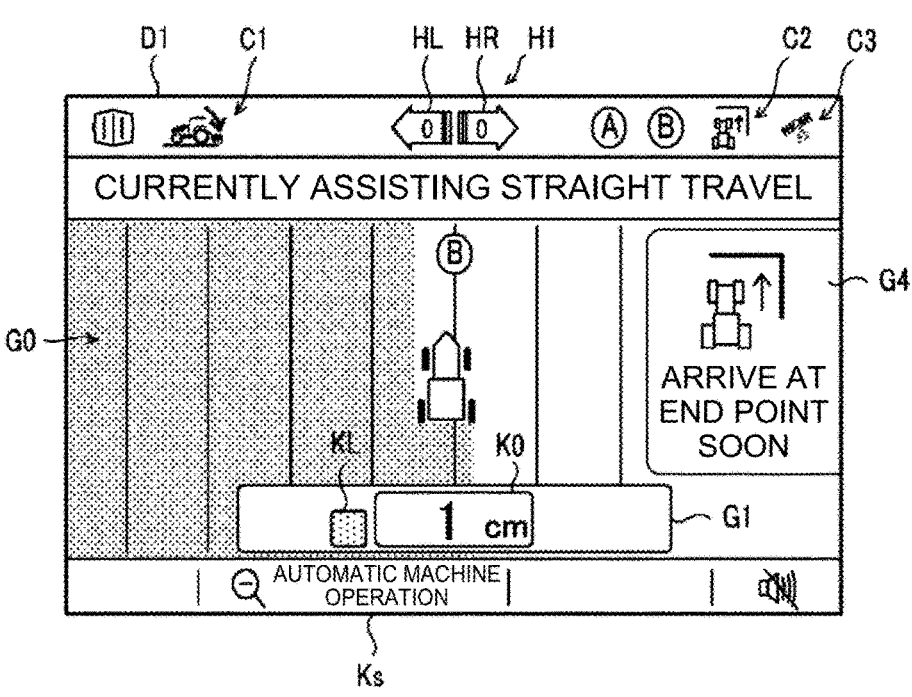
FIG. 17A is a view illustrating an example of the setting screen that is displayed in the operation device according to the embodiment of the present invention.
Figure 17B:
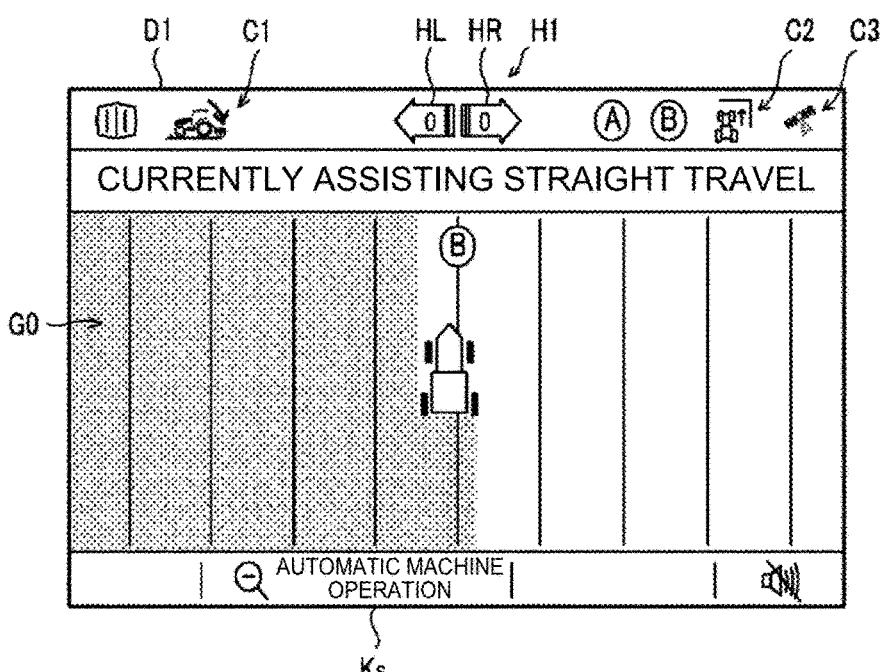
FIG. 17B is a view illustrating an example of the setting screen that is displayed in the operation device according to the embodiment of the present invention.

As another embodiment of the present invention, for example, in the case where the display areas A2, A3 are set to non-display ("OFF"), as illustrated in FIG. 17A, the operation control unit 71 may display (expand the display of) the travel information G0 in the display area A0 that corresponds to the display areas A2, A3. For example, in the case where the display areas A1 to A4 are set to non-display ("OFF"), as illustrated in FIG. 17B, the operation control unit 71 may display (expand the display of) the travel information G0 in the display area A0 that corresponds to the display areas A1 to A4. Just as described, the operation control unit 71 may change the display content of the travel information G0 according to the setting state of the display or the non-display of the display areas A1 to A4 included in the display area A0. Here, the operation control unit 71 may always display (expand the display of) the travel information G0 in the entire display area A0, and may superimpose the travel information G1 to G4 over the travel information G0 when the display target is set in each of the display areas A1 to A4.

As another embodiment of the present invention, the operation control unit 71 may display the guidance information in a manner to correspond to the icon image that is displayed in the display area A5 (see FIG. 7) of the work screen D1. For example, when the operator selects (performs the touch operation on the touch panel) the icon image C2 on the work screen D1 illustrated in FIG. 17B, as the guidance information that corresponds to the icon image C2, the operation control unit 71 displays the travel information G4 ((a) in FIG. 16) in the display area A4 (see FIG. 17A). In addition, for example, when the operator selects (performs the touch operation of) the icon image C3 on the work screen D1 illustrated in FIG. 17B, as the guidance information that corresponds to the icon image C3, the operation control unit 71 displays information on the positioning state ((e) in FIG. 16) in the display area A4. Furthermore, for example, when the operator selects (performs the touch operation of) the icon image C1 on the work screen D1 illustrated in FIG. 17B, as the guidance information that corresponds to the icon image C1, the operation control unit 71 displays information on a state of the linkage function of the autonomous travel start operation (for example, "SETTING TO START AUTONOMOUS TRAVEL WITH LOWERING OPERATION OF LIFTING/LOWERING LEVER IS ON" or the like) in the display area A4.

As another embodiment of the present invention, the operation control unit 71 may determine the travel information G1 to G4 to be displayed in the display areas A1 to A4 on the basis of setting history information by the operator. For example, the operation control unit 71 prioritizes the travel information corresponding to the setting item with high selection frequency of the setting items that have been selected by the operator in the past, and displays such travel information in the display area. When the operator changes the setting item, the operation control unit 71 prioritizes the travel information corresponding to the changed setting item and displays such travel information in the display area.

In the case where it is set not to display the guidance information (the travel information G4) in the display area A4 and the operator does not perform the necessary operation, the operation control unit 71 may switch the setting to the display of the guidance information. For example, in the case where the operator does not issue the travel start instruction with high frequency even when the autonomous travel start condition is satisfied, the operation control unit 71 switches the setting to the display of the guidance information (the travel information G4) in the display area A4. In addition, in the case where the operator does not perform the end operation with high frequency even when the work vehicle 10 during the autonomous travel has arrived at the end point, the operation control unit 71 switches the setting to the display of the guidance information (the travel information G4) in the display area A4.

The work vehicle 10 in the present invention may also be able to travel autonomously when turning. In this case, the target route R includes the straight route and the turning road. In addition, in the work vehicle 10, the operator may be able to switch between the autonomous travel and the manual travel during the turn. Furthermore, the unmanned autonomous travel of the work vehicle 10 may be allowed on the target route R. In this case, the operator may remotely control the operation terminal to make the travel start instruction or the like. The operation terminal that is used for the remote control may be the operation device 17 according to the present embodiment or may include each of the processing units in the operation device 17.

The operation assistance system according to the present invention may be constructed of the operation device 17 alone or may be constructed of the server that includes each of the processing units provided in the operation device 17. The operation assistance system may be constructed of the work vehicle 10 that includes the operation device 17.

REFERENCE SIGNS LIST

1: Autonomous travel system
10: Work vehicle
11: Vehicle controller
17: Operation device (operation terminal)
71: Operation control unit 72: Storage unit 73: Operation display unit 711: Display processing unit (first display processing unit, second display processing unit)

712: Acceptance processing unit

713: Setting processing unit

A0: Display area (first display area)

A1: Display area (second display area)

A2: Display area (second display area)

A3: Display area (second display area)

A4: Display area (second display area)

A5: Display area (third display area)

C1: Icon image

C2: Icon image

C3: Icon image

H1: Icon image

D1: Work screen

F: Field

G: Travel information

P1: Setting screen

P11: Setting screen

P12: Setting screen

P2: Setting screen

P21: Setting screen

P22: Setting screen

The invention claimed is:

1. An operation assistance method executing:

displaying a display screen on an operation terminal that is used for a travel operation of a work vehicle;

displaying first information on a location of the work vehicle in a first display area included in the display screen; and switching between a setting to display second information on a travel state of the work vehicle in a second display area included in the display screen and a setting not to display the second information in the second display area, wherein the display screen includes a plurality of the second display areas, and mutually different pieces of the second information on the travel state of the work vehicle are able to be each be displayed in respective one of the plurality of second display areas.

2. The operation assistance method according to claim 1 further executing:

accepting, from an operator, a first setting operation for the setting to display the second information in the second display area or a second setting operation for the setting not to display the second information in the second display area; and displaying the first information in the first display area and displaying the second information in the second display area when accepting the first setting operation from the operator, and displaying the first information in the first display area and not displaying the second information in the second display area when accepting the second setting operation from the operator.

3. The operation assistance method according to claim 2, wherein the second information includes information that corresponds to each of plural setting items for a travel state of the work vehicle, and when the first setting operation to select any one of the plural setting items is accepted from the operator, the second information that corresponds to the selected setting item is displayed in the second display area.

4. The operation assistance method according to claim 2, wherein the second information includes at least one of information on a travel status of the work vehicle, information on a work status of the work vehicle, and operation guidance information.

5. The operation assistance method according to claim 1, wherein the plurality of second display areas are arranged in the first display area.

6. The operation assistance method according to claim 5 further executing:

displaying the first information at a center of the display screen in the first display area; and displaying the second information on each side of the center of the display screen in the first display area.

7. The operation assistance method according to claim 1, wherein a display content of the second information to be displayed in the second display area can be changed according to the number of the second display area.

8. The operation assistance method according to claim 1 further comprising:

displaying an icon image that corresponds to the second information in a third display area included in the display screen; and changing a display mode of the icon image according to the travel state of the work vehicle.

9. The operation assistance method according to claim 1 further comprising:

determining the second information to be displayed in the second display area on the basis of setting history information by the operator.

10. An operation assistance system comprising:

a first display processing unit that displays a display screen on an operation terminal used for a travel operation of a work vehicle;

a second display processing unit that displays first information on a location of the work vehicle in a first display area included in the display screen; and a setting processing unit that switches between a setting to display second information on a travel state of the work vehicle in a second display area included in the display screen and a setting not to display the second information in the second display area, wherein the display screen includes a plurality of the second display areas, and mutually different pieces of the second information on the travel state of the work vehicle are able to be each be displayed in respective one of the plurality of second display areas.

11. An operation assistance program for causing one or plural processors to:

display a display screen on an operation terminal that is used for a travel operation of a work vehicle;

display first information on a location of the work vehicle in a first display area included in the display screen; and switch between a setting to display second information on a travel state of the work vehicle in a second display area included in the display screen and a setting not to display the second information in the second display area, wherein the display screen includes a plurality of the second display areas, and mutually different pieces of the second information on the travel state of the work vehicle are able to be each be displayed in respective one of the plurality of second display areas.

\* \* \* \* \*